Figure 1:
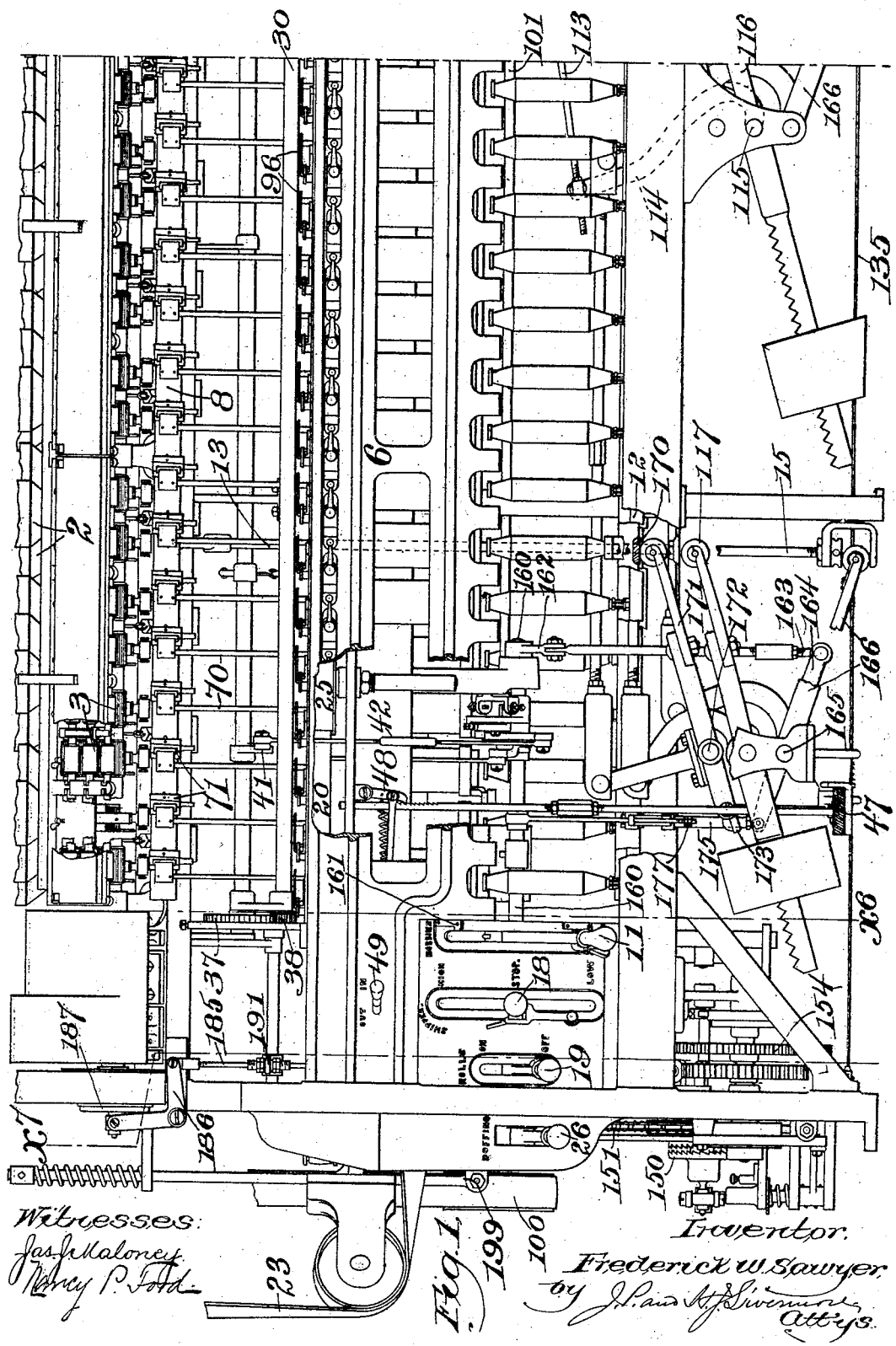

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 1.

Witnesses:
Jas. F. Maloney
Nancy P. Ford

Inventor.
Frederick W. Sawyer
by J. P. and A. F. Livermore
Att'ys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 3.

Witnesses:
Jas. J. Maloney.
Nancy P. Ford.

Inventor,
F. W. Sawyer,
by Livermore
Attys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 4.

Witnesses:
Jas. J. Maloney
Nancy P. Ford

Inventor,
Frederick W. Sawyer
by J. P. and H. P. Livermore
Attys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 5.
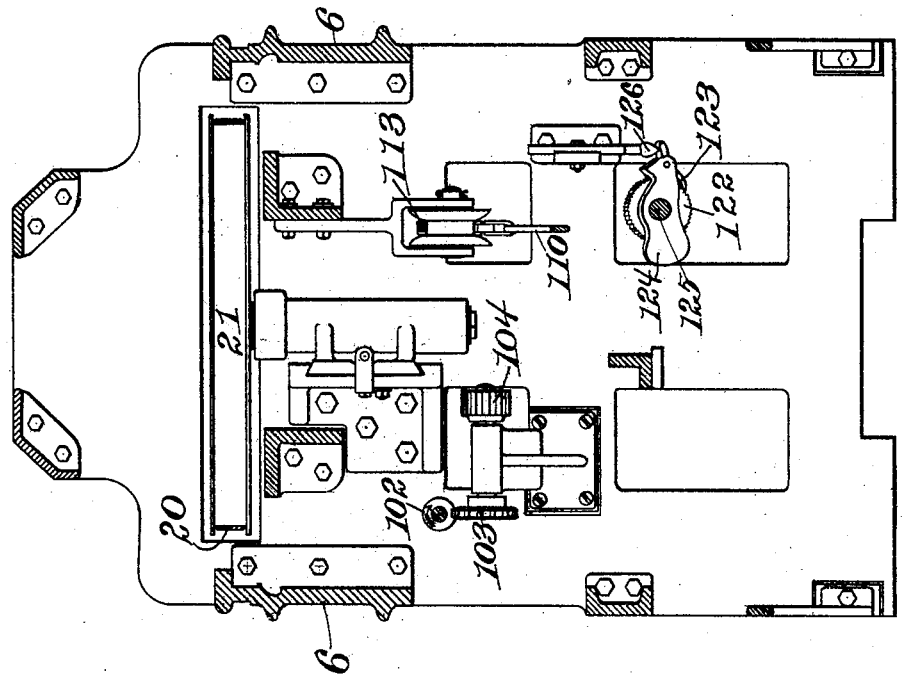
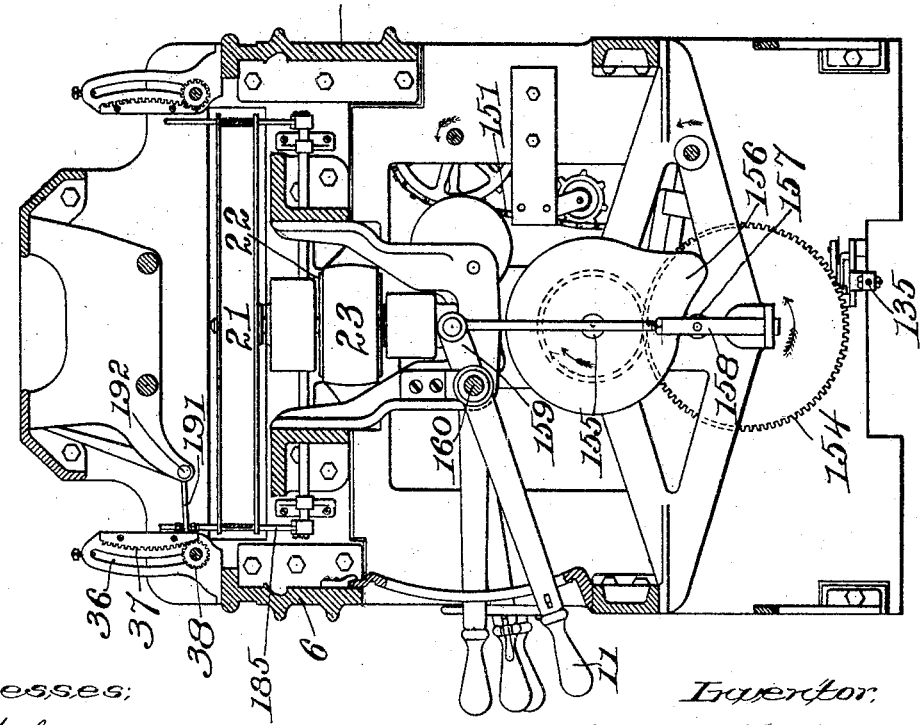
Witnesses:
Jas. J. Maloney.
Nancy P. Ford.
Inventor:
Frederick W. Sawyer,
by J. P. and J. H. Livermore
Att'ys.

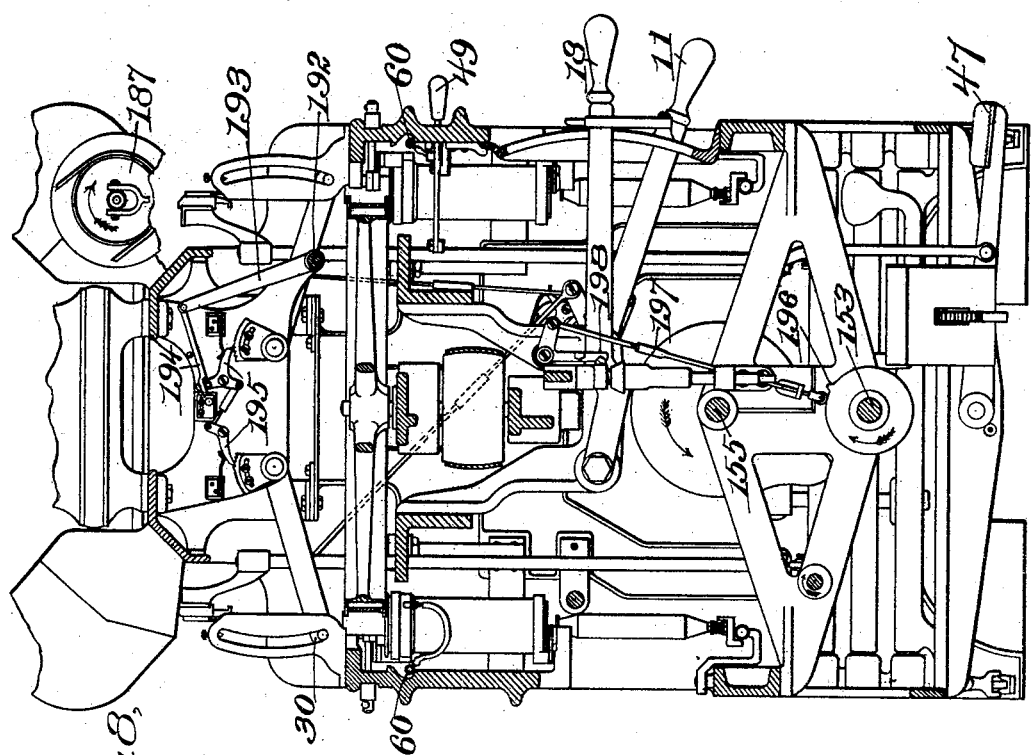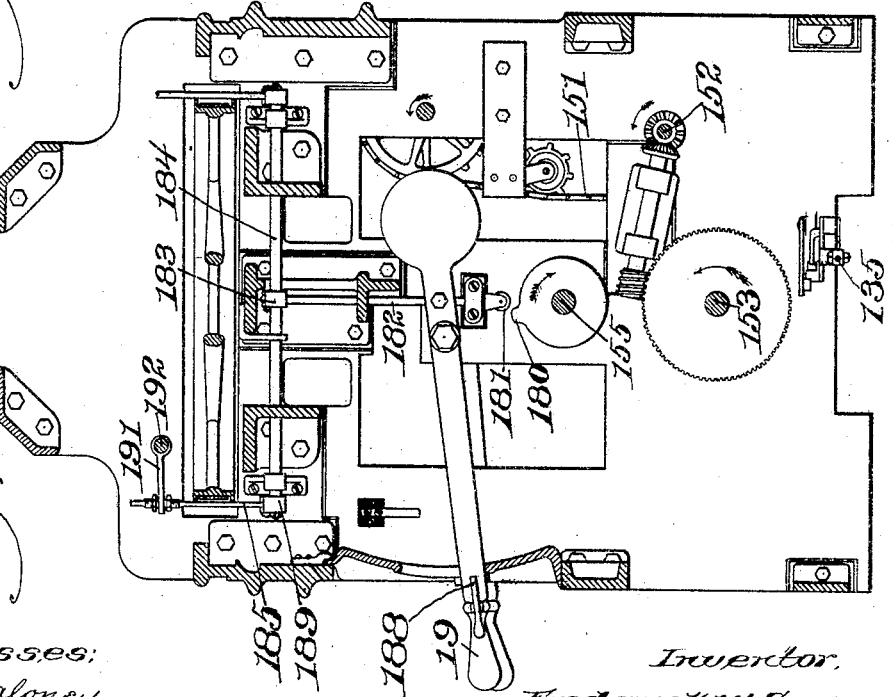

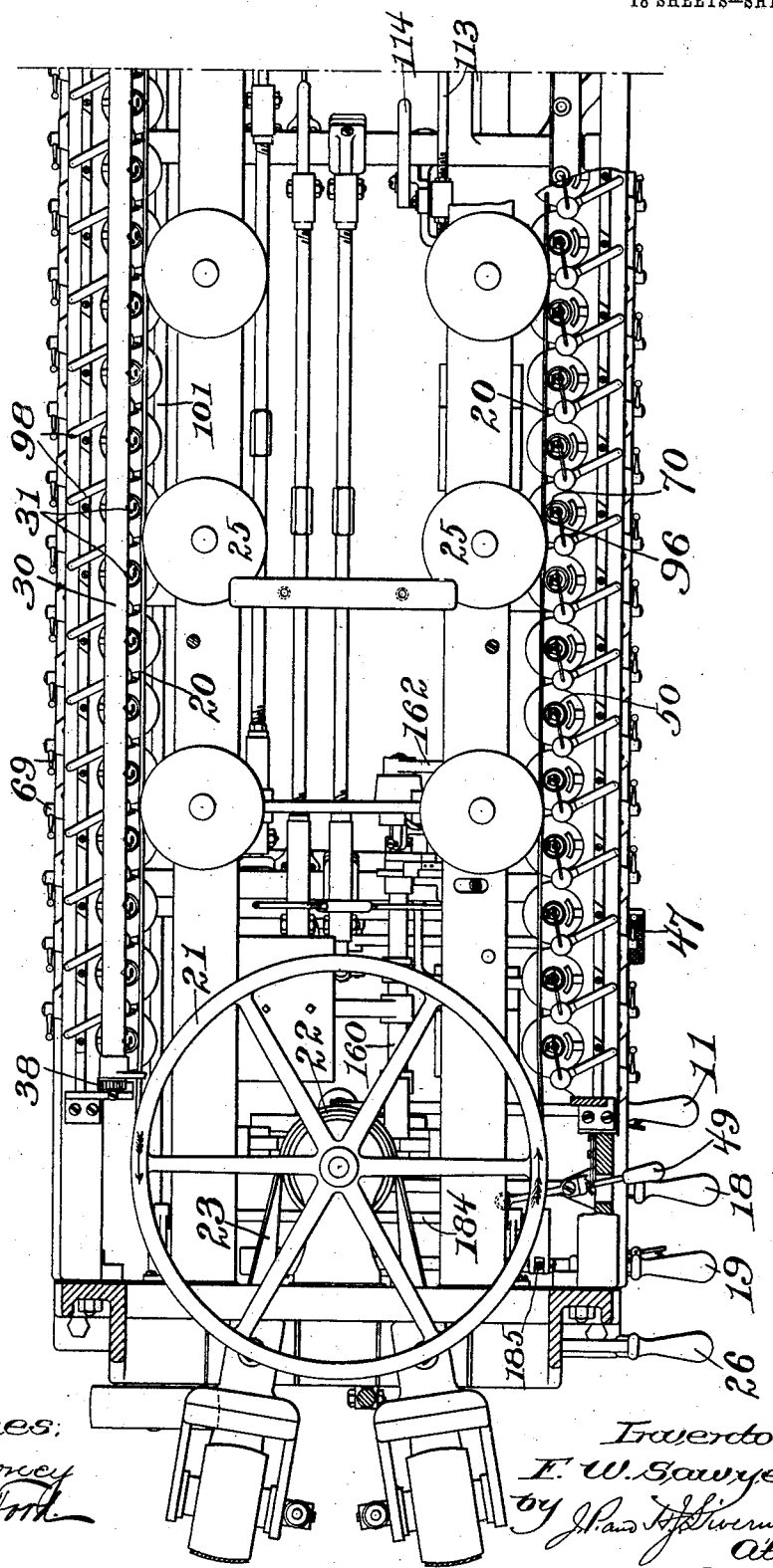

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 8.

Witnesses:
Jas. J. Maloney
Nancy P. Toth

Inventor,
Frederick W. Sawyer,
by J. P. and J. P. Livermore
Att'ys.

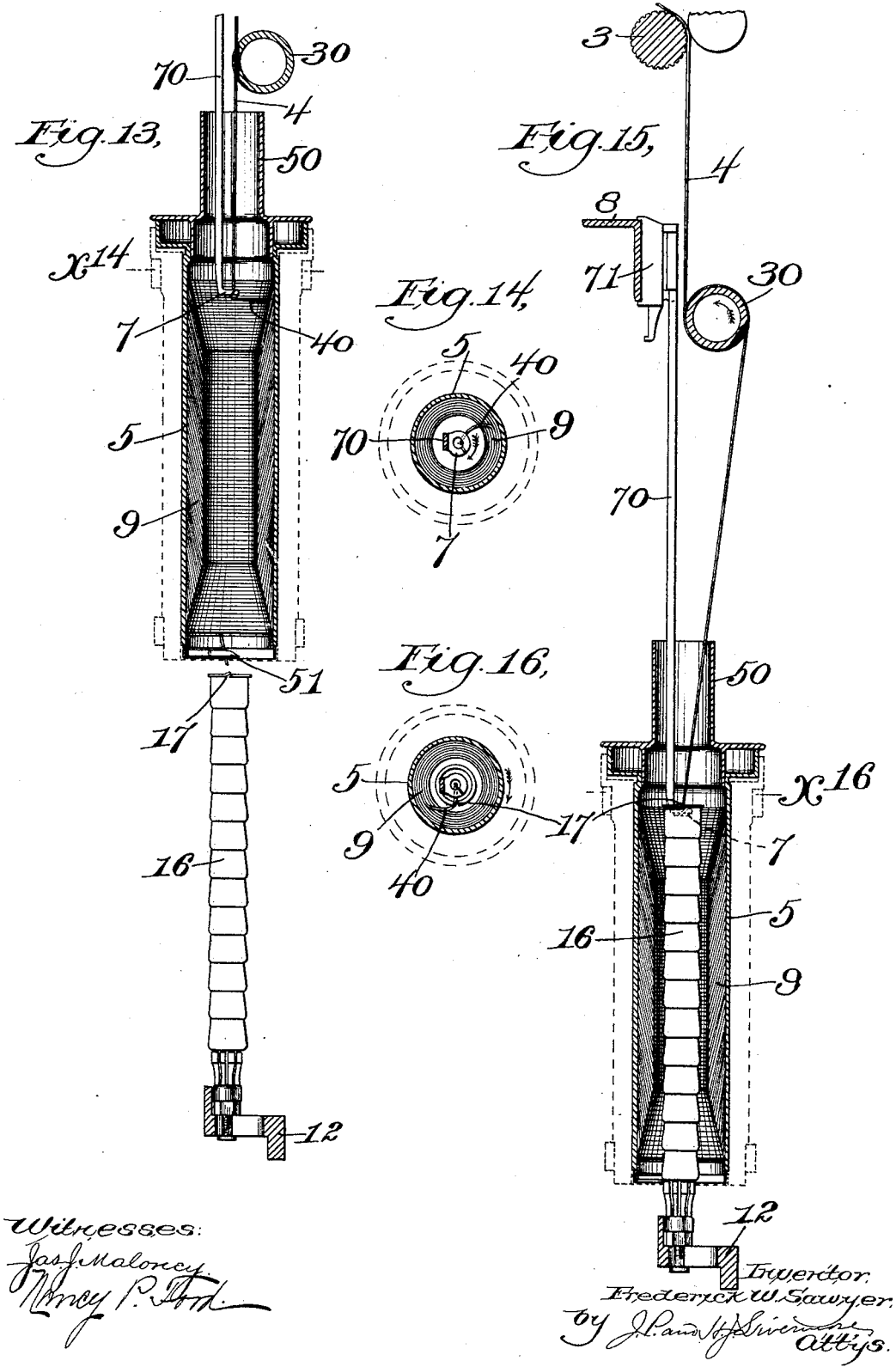

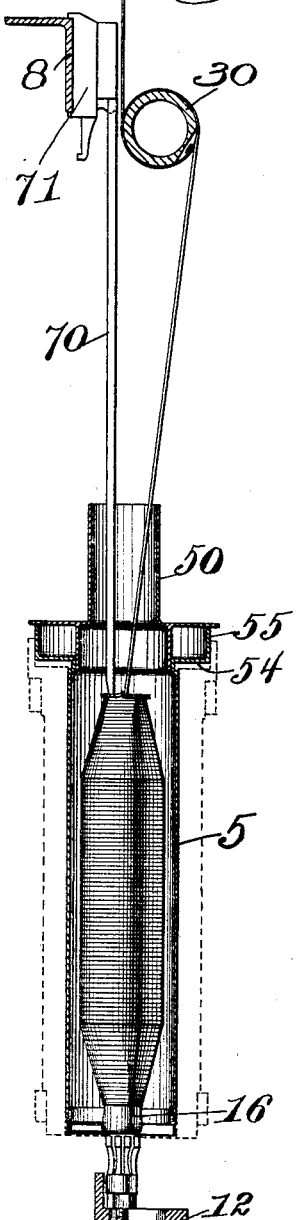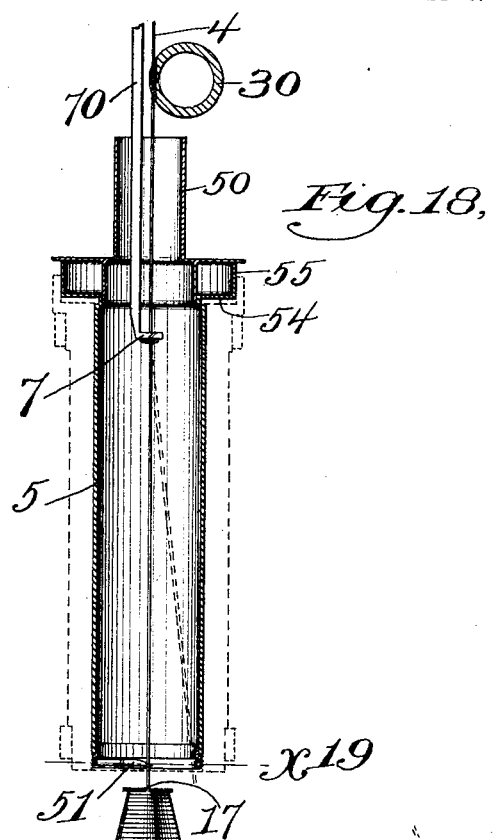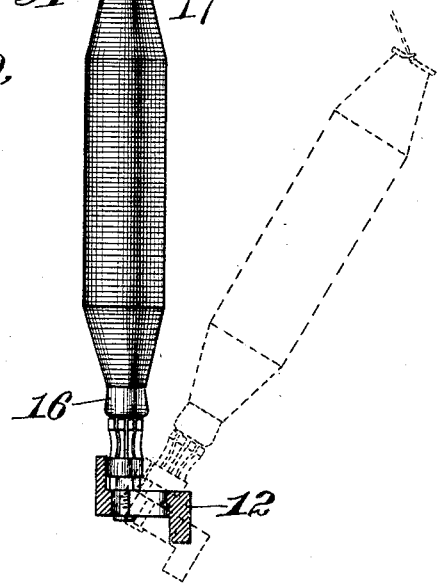

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 11.
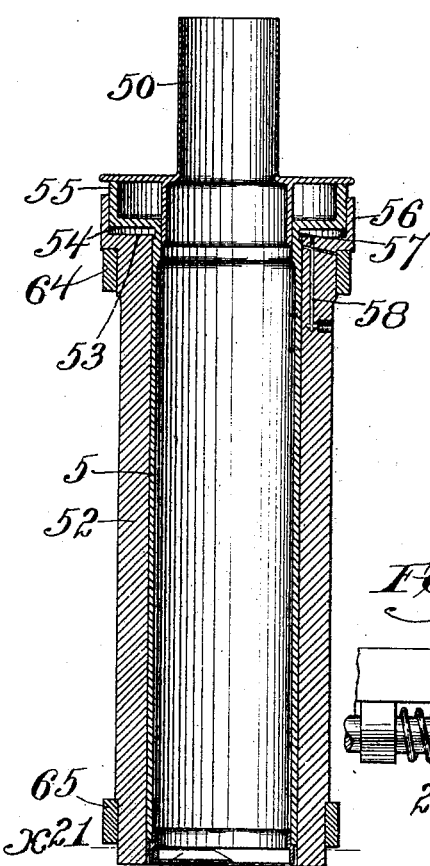
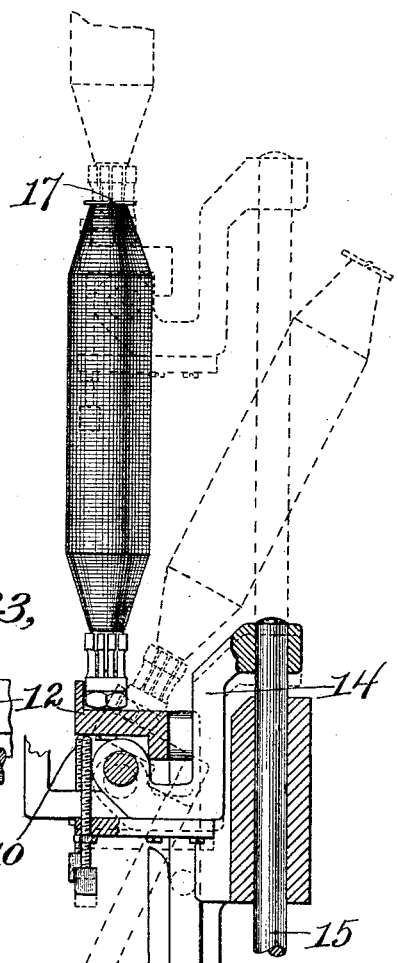
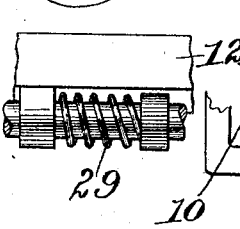
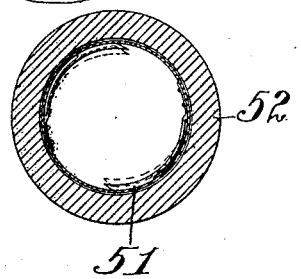
Witnesses:
Jas. J. Maloney
Nancy P. Ford
Inventor,
Frederick W. Sawyer,
by J. Paul J. Livermore
Attys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 12.
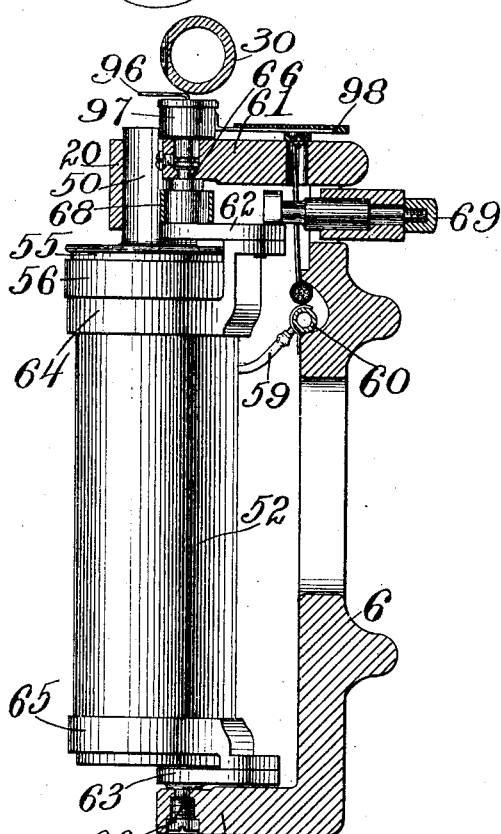
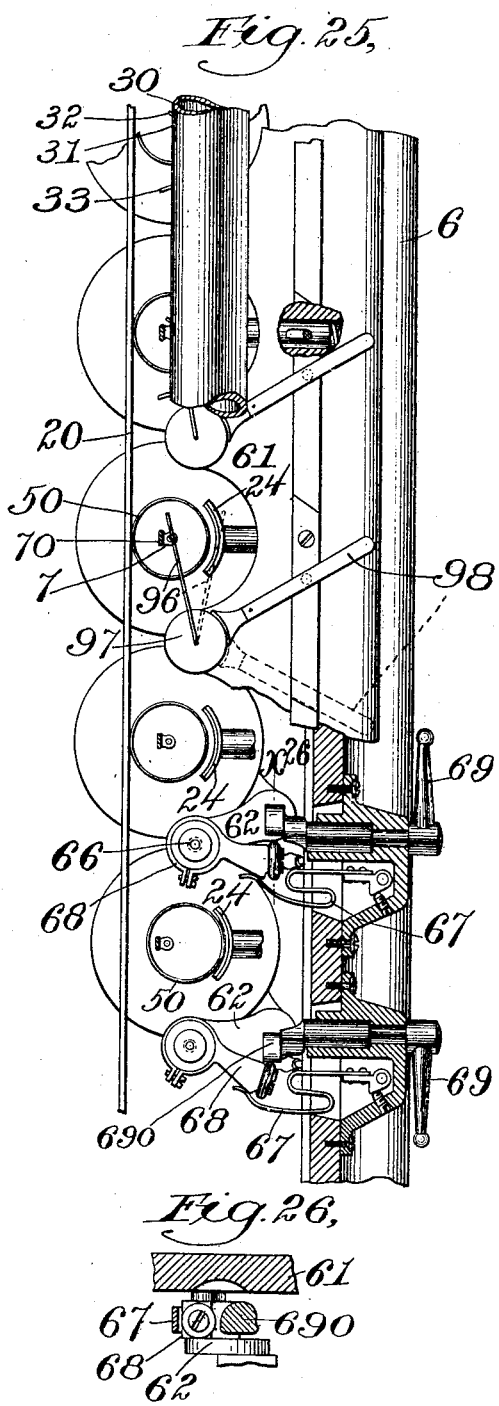
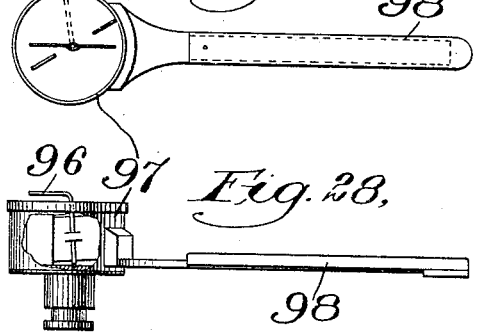
Witnesses:
Inventor,
Frederick W. Sawyer,
by Wigmore and Wigmore
Attys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 13.
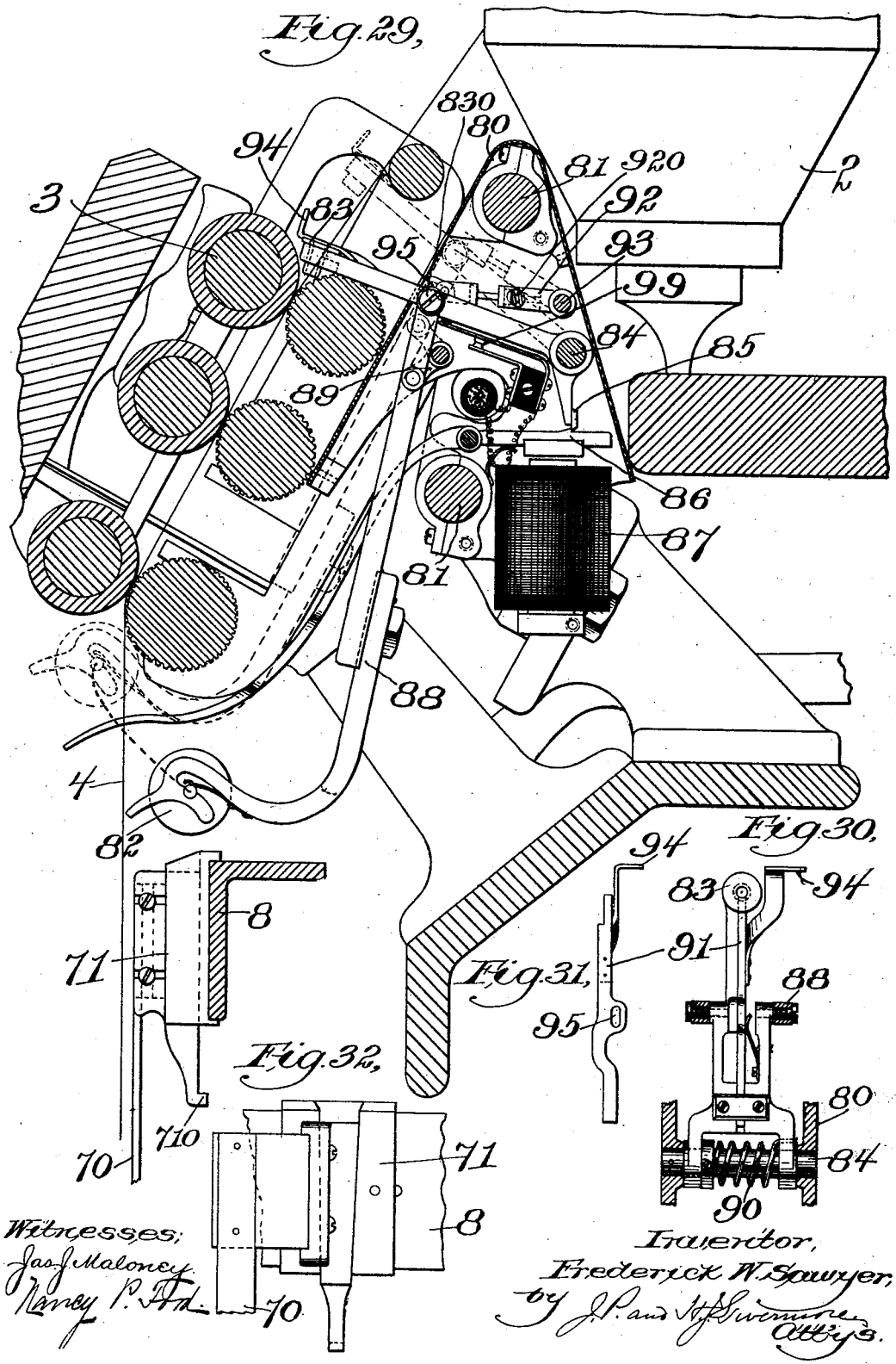

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 14.

Witnesses:
Jas. J. Maloney
Nancy R. Ford

Inventor,
Frederick W. Sawyer
by J. P. and J. J. Swernan
Att'ys.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 17.

Witnesses:
Inventor,
Frederick W. Sawyer,
by Livermore
Atty's.

No. 771,396. PATENTED OCT. 4, 1904.
F. W. SAWYER.
APPARATUS FOR SPINNING OR TWISTING.
APPLICATION FILED FEB. 7, 1902.
NO MODEL. 18 SHEETS—SHEET 18.
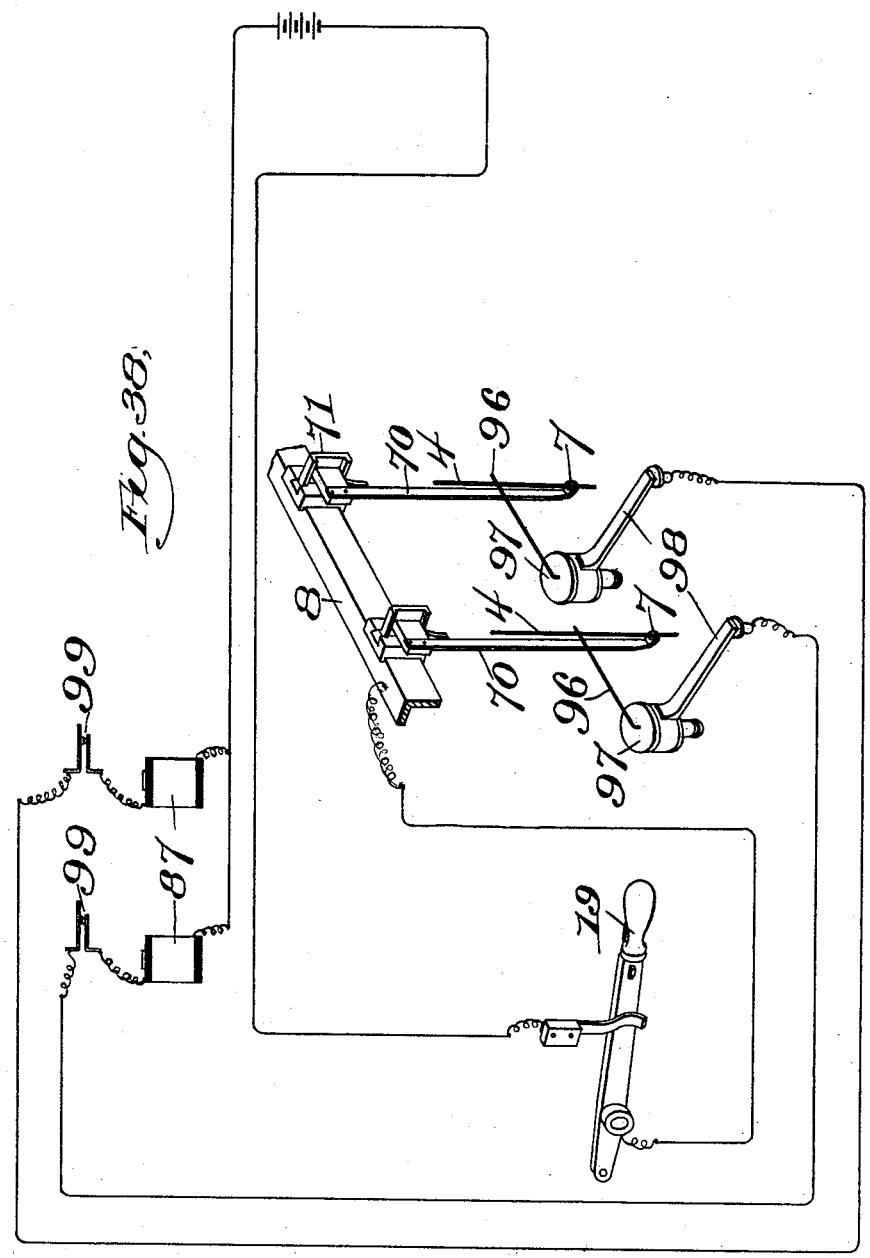

No. 771,396. Patented October 4, 1904.

UNITED STATES PATENT OFFICE.

FREDERICK WENTWORTH SAWYER, OF BOSTON, MASSACHUSETTS, ASSIGNOR TO COCOON SPINNER COMPANY, A CORPORATION OF MAINE.

APPARATUS FOR SPINNING OR TWISTING.

SPECIFICATION forming part of Letters Patent No. 771,396, dated October 4, 1904.

Application filed February 7, 1902. Serial No. 92,989. (No model.)

*To all whom it may concern:*

Be it known that I, FREDERICK WENTWORTH SAWYER, of Boston, county of Suffolk, and State of Massachusetts, have invented an Improvement in Apparatus for Spinning or Twisting, of which the following description, in connection with the accompanying drawings, is a specification, like numerals on the drawings representing like parts.

This invention relates to an apparatus for spinning yarn or performing analogous spinning or twisting operations and winding said spun or twisted material on a bobbin or other suitable core or support in order that said material may be removed from the appliances concerned in its production in suitable form for subsequent operations to which it may be subjected or subsequent uses to which it may be put.

The invention consists partly in the combination of appliances which twist the material and collect the spun or twisted material in the form of a hollow coil with means for winding the said coiled material on a core or support—such, for example, as a spool, bobbin, or cop-tube—when a sufficient quantity of spun or twisted material has been collected to properly fill a spool or cop or when the spun yarn has accumulated to the desired amount within the capacity of the spinning device, from which the spun yarn must be removed in order that the spinning operation may be continued or repeated.

The invention further consists in certain features of construction of the spinning appliances which contribute to their efficiency, although not essentially involved in the novel construction and mode of operation of the spinning and winding appliances proper; and the invention also consists in the combination with the spinning and winding appliances of auxiliary appliances hereinafter described which contribute to the practical efficiency of the apparatus.

The active member of the spinning appliances proper consists of a hollow chamber adapted to be rotated at high speed, said chamber having an opening in its end—that is, about its axis of rotation—through which the material being spun enters.

For the purpose of illustration the material is herein shown as yarn spun from the usual roving, which is supplied to the hollow spinning-chamber by drawing-rolls of the usual construction, and said roving in passing to the interior of the rotating spinning-chamber is passed through a guide or eye, preferably located in the axis of rotation of the rotating chamber and having a traverse movement inside of the said chamber and in the direction of the axis of rotation thereof, said traverse movement serving to distribute the material as it is spun in the desired arrangement on the inner surface of the wall of the spinning-chamber.

In referring to the operation of the appliances for spinning or twisting the material the term "twist" will be used as including either the operation of twisting together the fibers of a single strand, as in spinning yarn, or the twisting together of a number of strands, as in the manufacture of thread.

The mode of operation of the twisting and collecting or coiling appliances above described is as follows: The end of the roving delivered from the drawing-rolls is passed through the guide-eye and is then brought into engagement with the rotating chamber. The engagement of the end of the roving with the rapidly-rotating chamber is sufficient to cause the end of the roving and the portion extending laterally from the guide to the wall of the rotating chamber to revolve, and thus imparts a twist to the material between its point of engagement with the rotating chamber and its point of delivery from the drawing-rolls, which are continually feeding the roving forward. The rapidity of rotation of the chamber is such that the centrifugal force on the short length of yarn extending laterally from the guide to the interior of the chamber is sufficient to pull the yarn or twisted material forward through the guide, and the spun yarn is thus laid upon the inner wall of the rotating chamber in proportion as it is delivered by the drawing-rolls, and by giving the guide-eye the proper traverse the yarn is thus coiled or laid upon different parts of the inner surface of the chamber with the distribution desired, thus building a definitely-coiled mass of spun yarn inside of the hollow spinning-chamber.

It has been proposed to spin yarn by means of a rotating hollow chamber or cup upon the interior of which the spun material would accumulate in the form of a hollow coil; but this plan has proved impracticable on account of mechanical difficulties encountered in the production of an apparatus to operate in such manner and because the material thus accumulated in the form of a hollow coil could not be removed from the spinning appliances in condition to be subsequently utilized in weaving or for other purposes without involving greater cost in time and labor than would compensate for the advantage which pertained to this method of spinning as compared with the methods now generally practiced in which the material is wound continuously or intermittingly in the spinning operation upon a bobbin or cop in proper condition for subsequent handling.

When a sufficient mass of yarn has been spun and coiled upon the inner surface of the spinning-chamber, it must be removed therefrom; and the present invention consists partly in the combination with the above-described twisting and collecting appliances of efficient means for thus removing the spun yarn from the hollow cylinder without interrupting its rotary movement, which will be described in connection with drawings, which illustrate a convenient and efficient embodiment of the invention.

Figure 2:
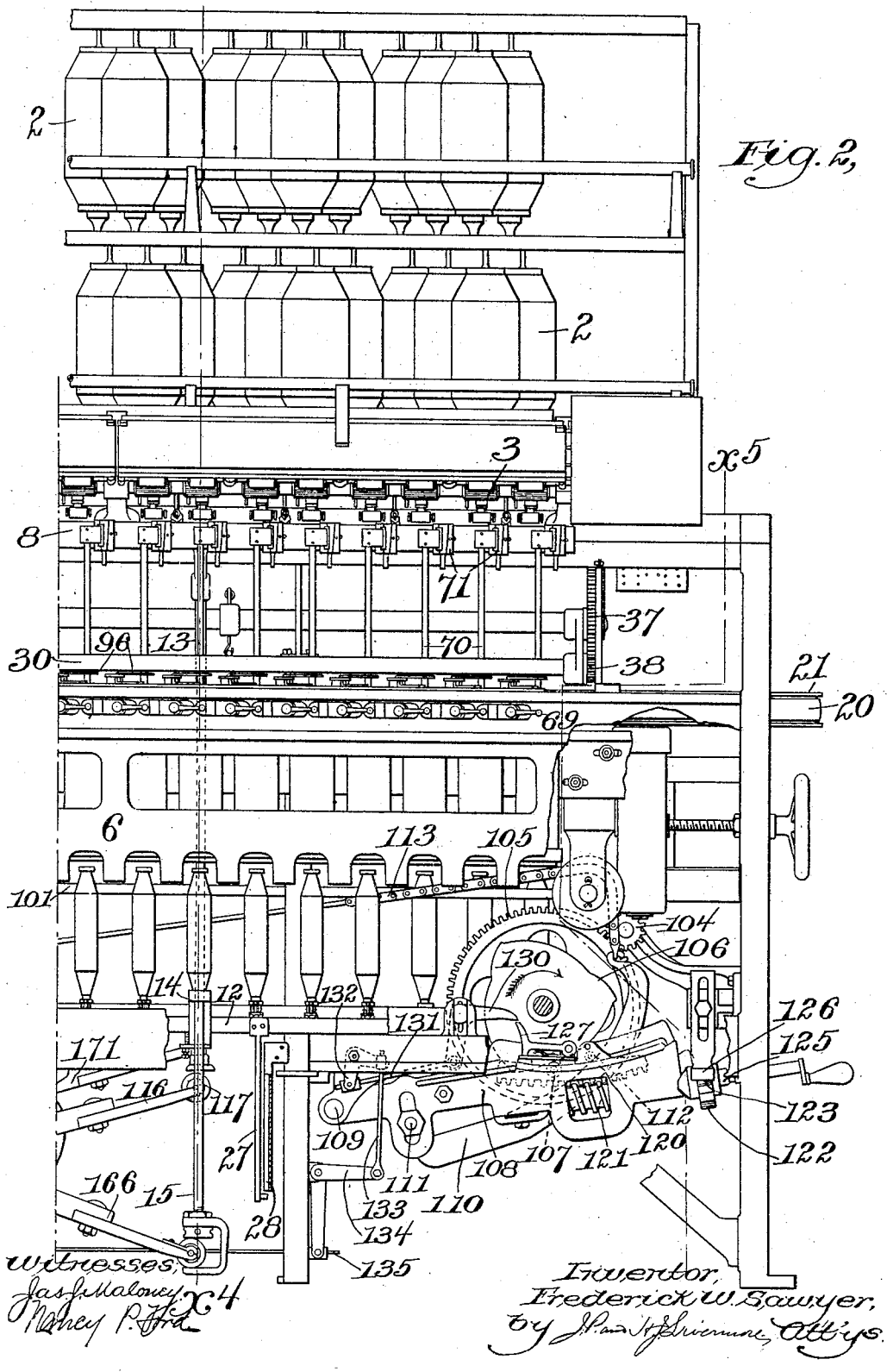
Figure 3:
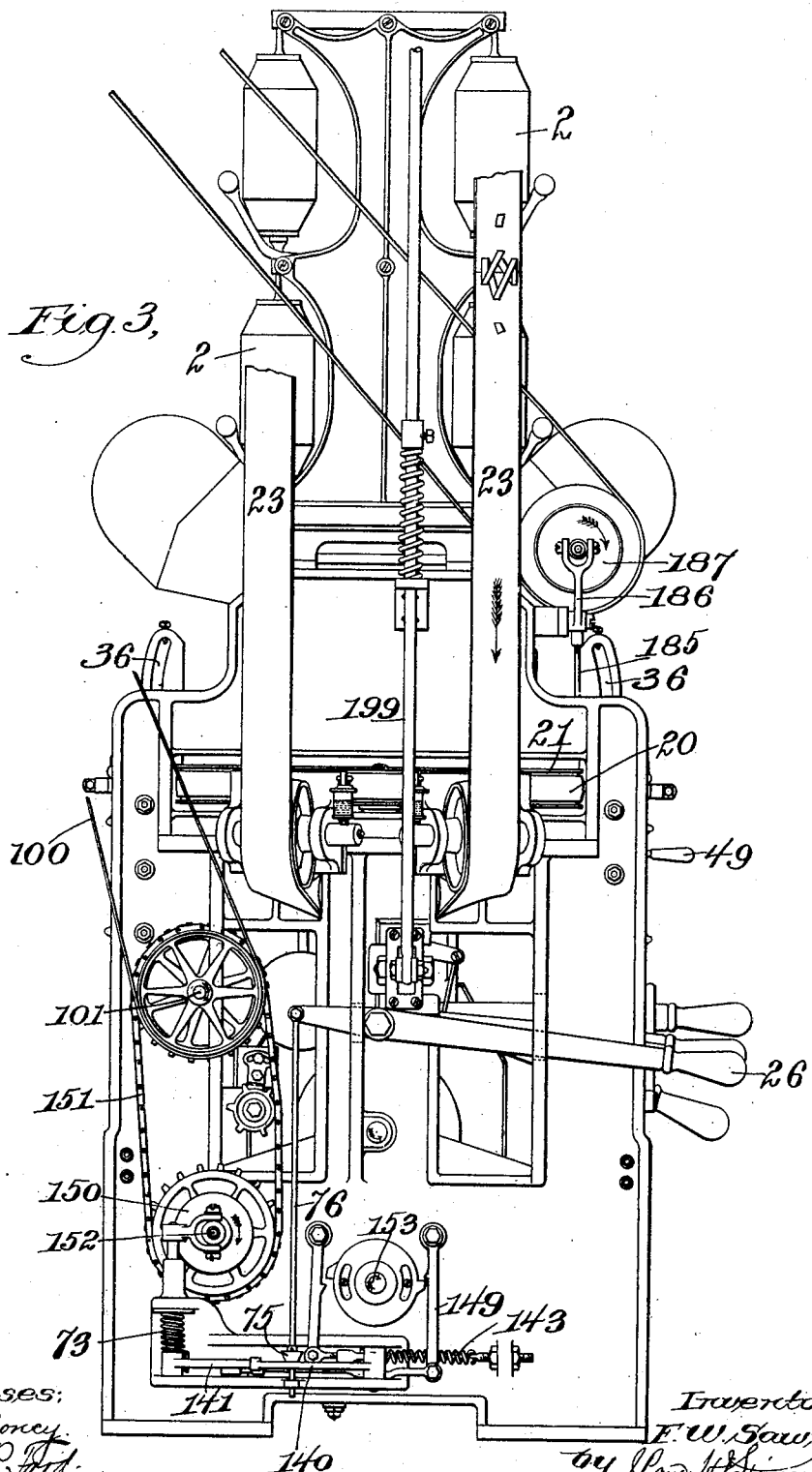
Figure 4:
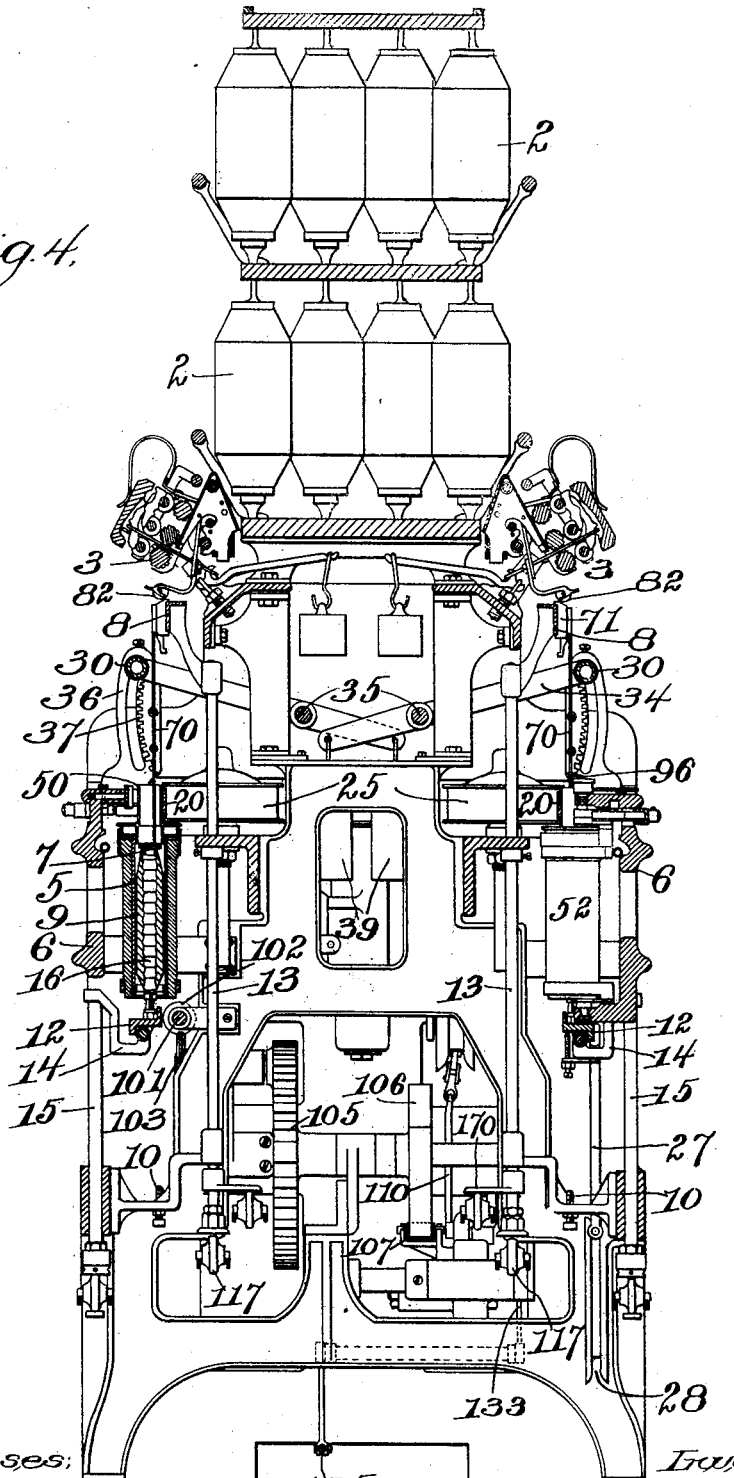
Figure 10:
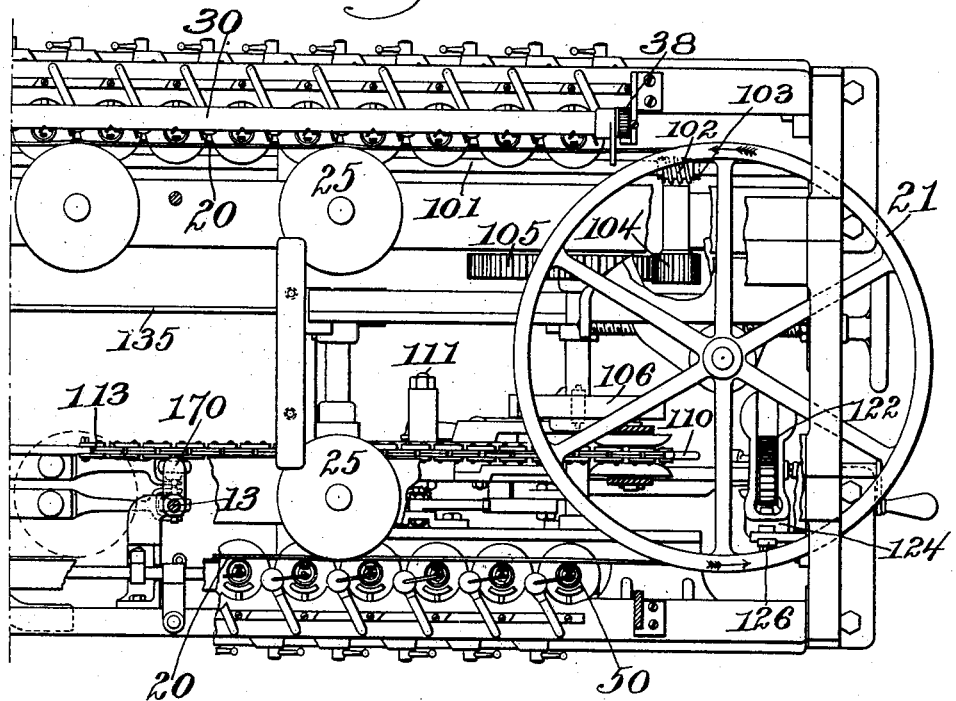
Figures 11, 12:
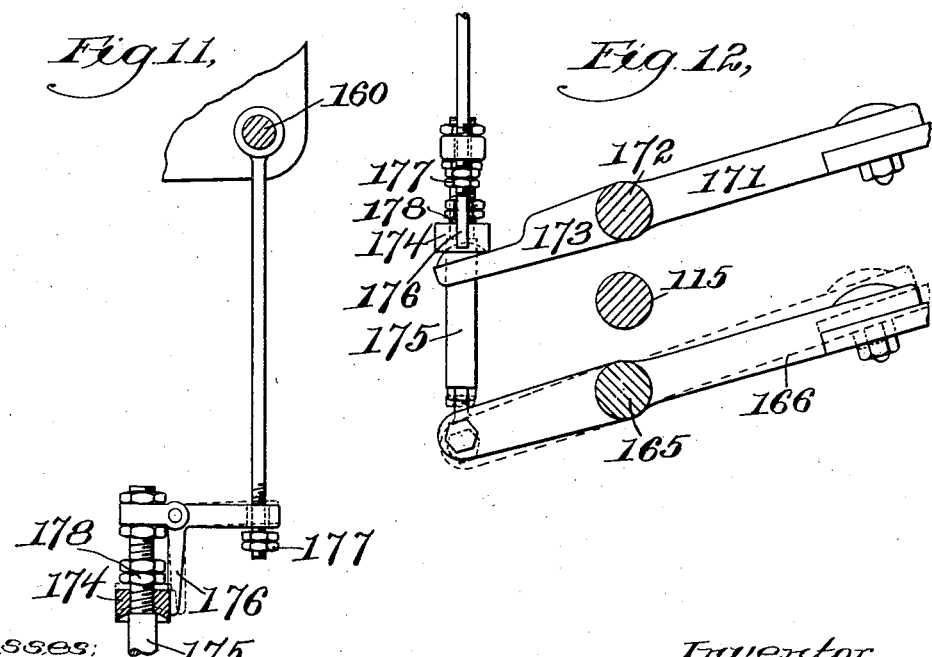
Figure 33:
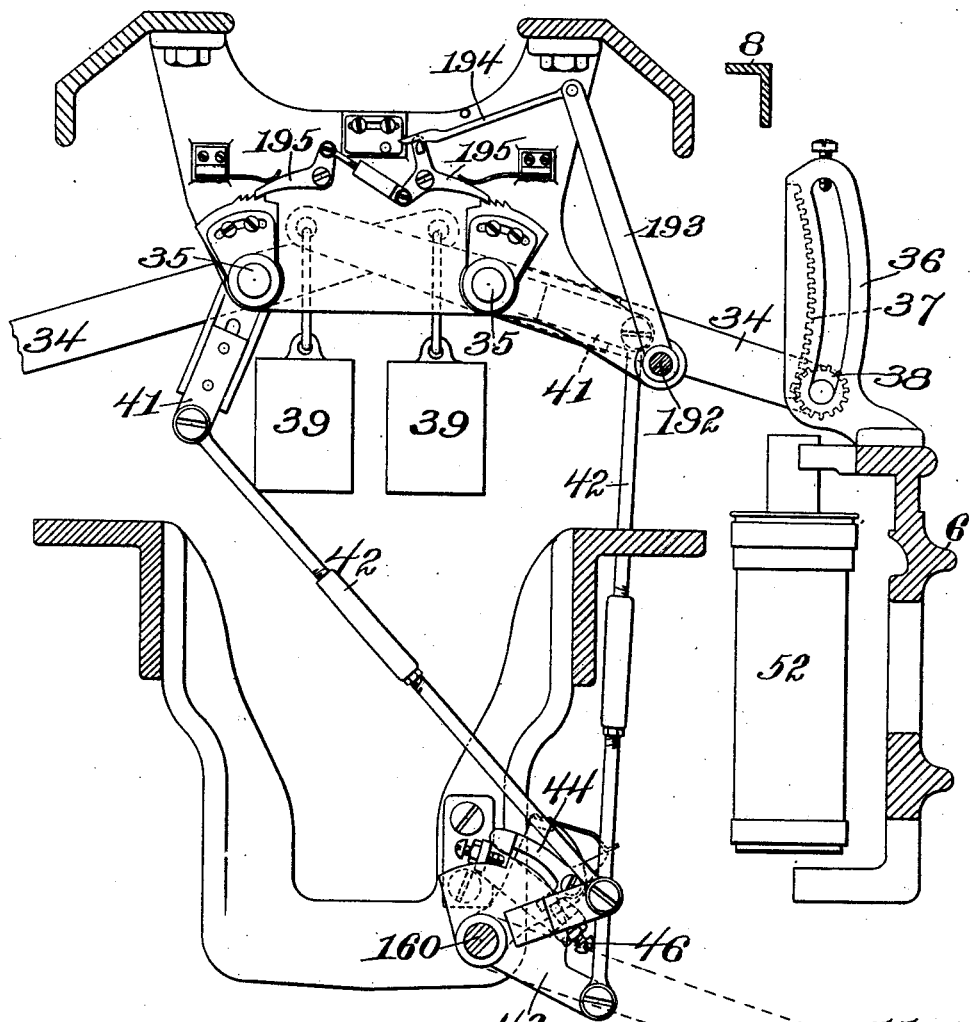
Figure 34:
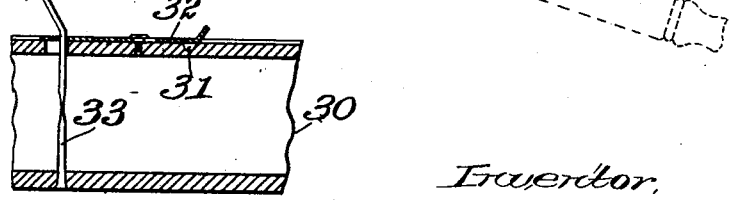
Figure 35:
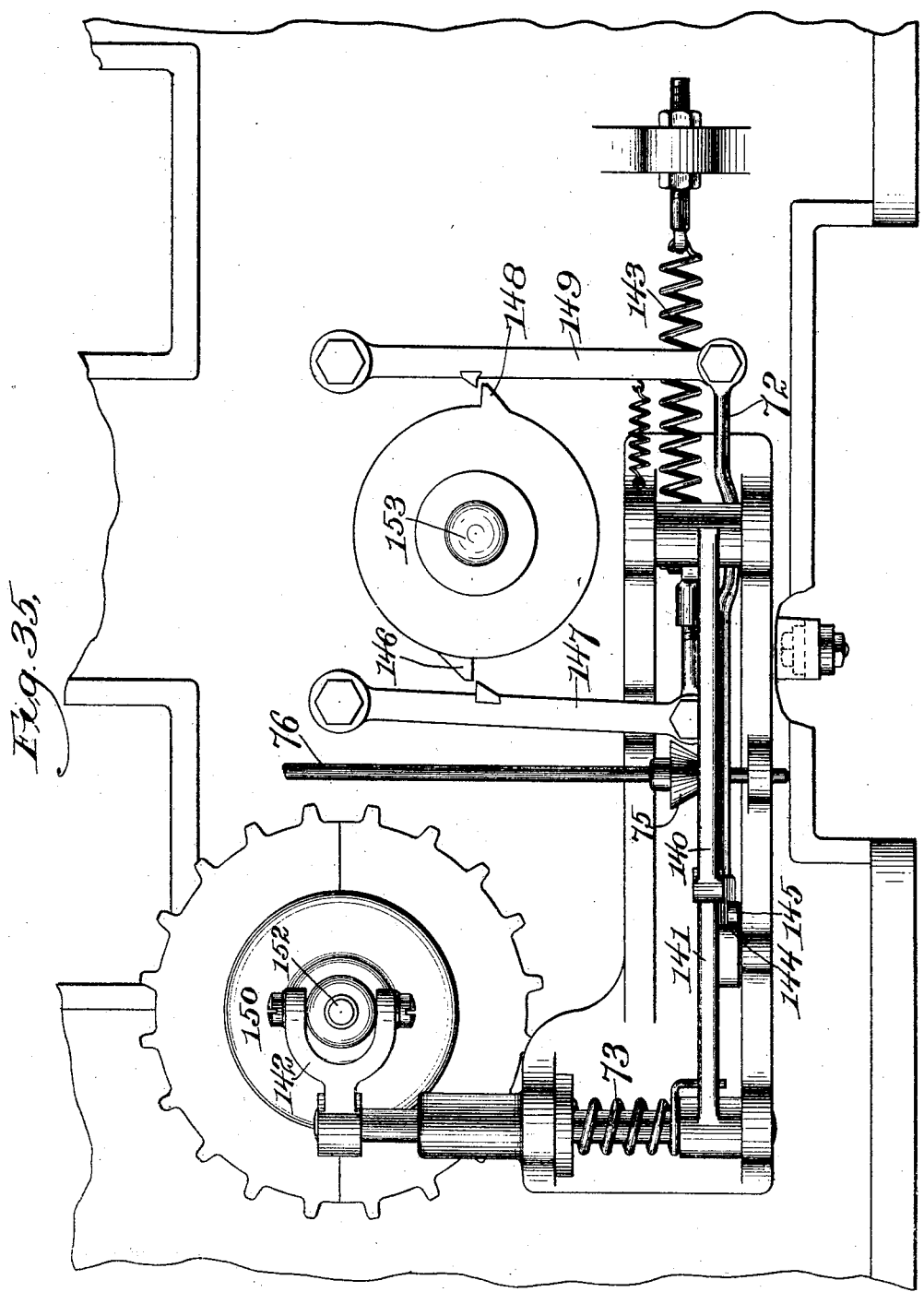
Figure 36:
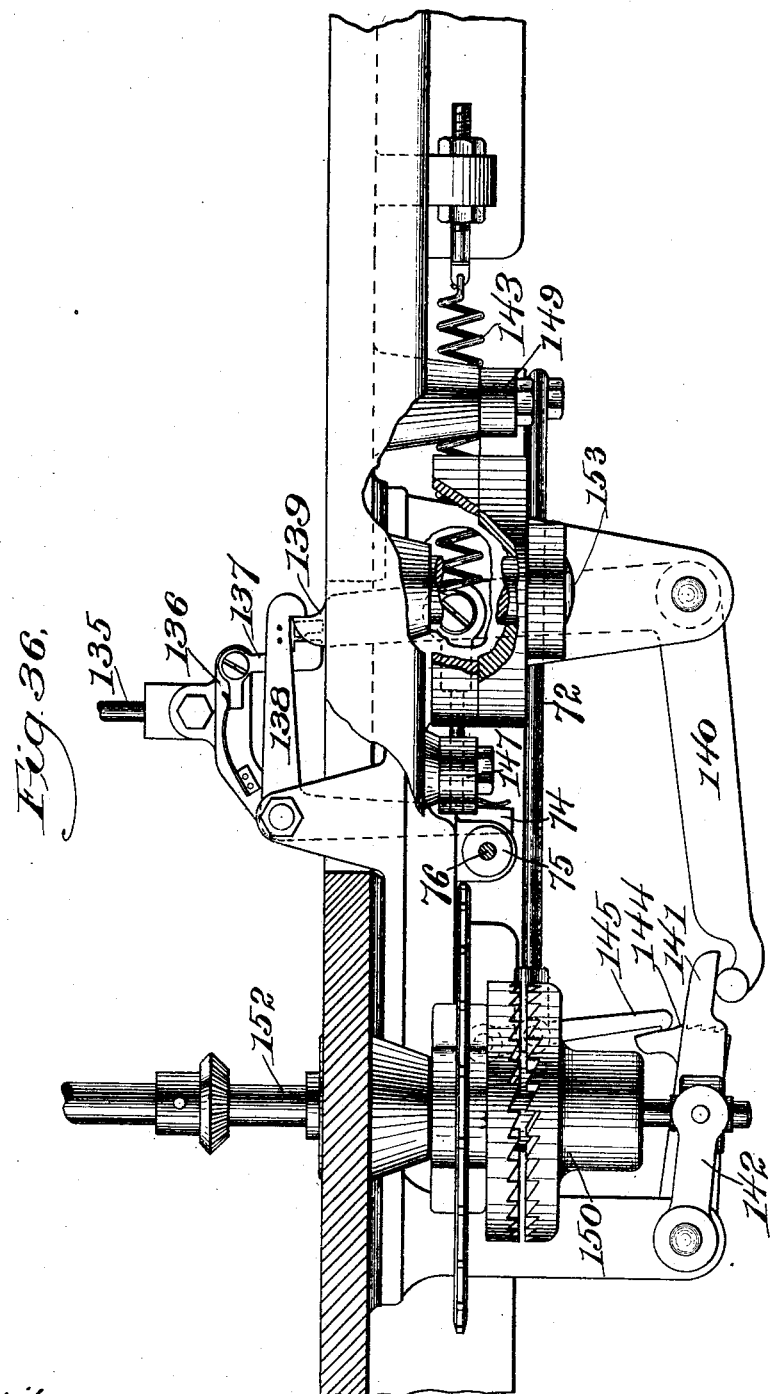
Figure 37:
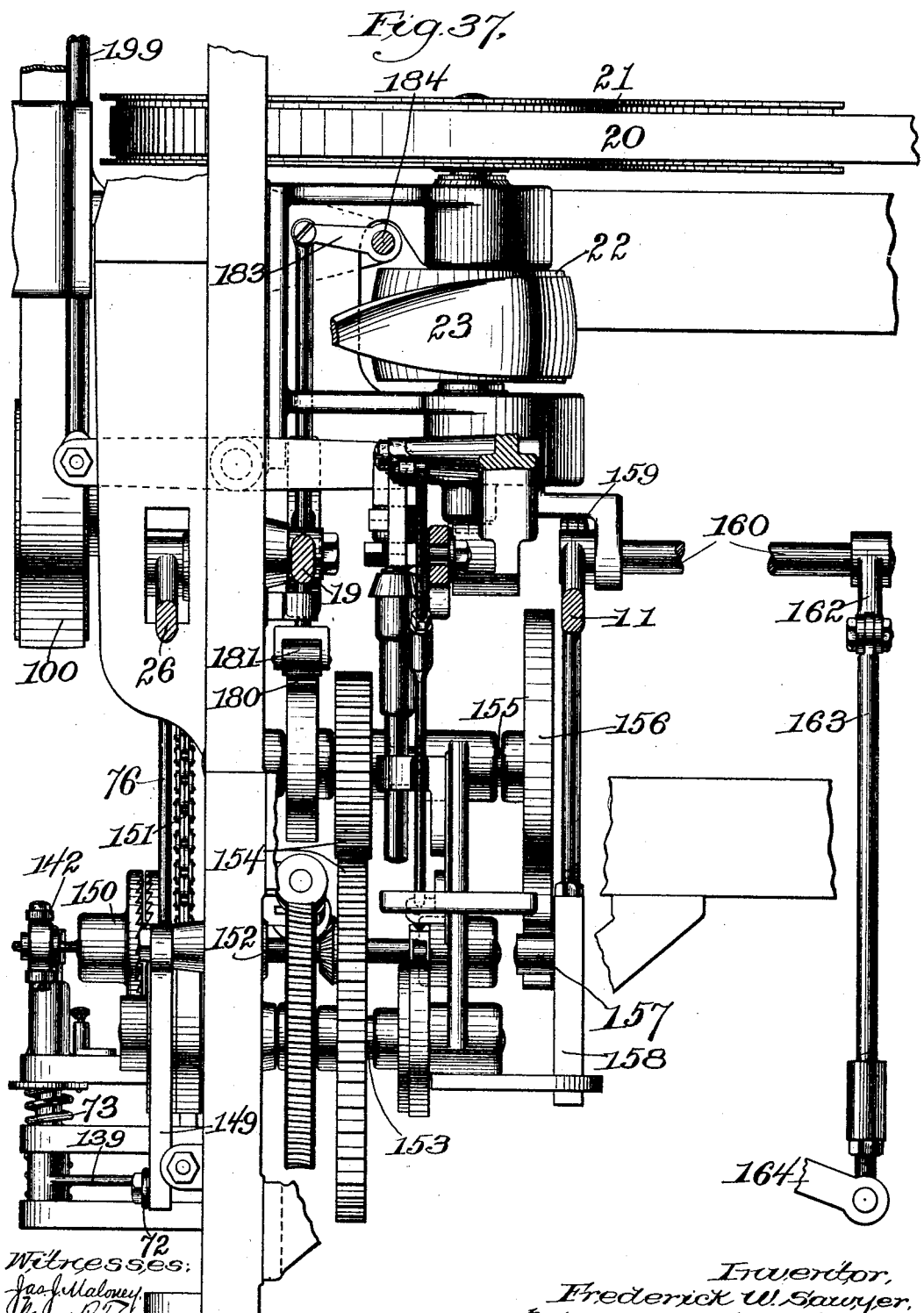

Figure 1 is a front elevation of the left-hand end of a spinning-frame provided with appliances embodying this invention for spinning yarn and winding the spun yarn upon bobbins and removing the filled bobbins from the spinning appliances, a portion of the framework being broken away and some parts being shown in section to better show certain parts of the actuating mechanism and a portion of the roving-bobbins at the upper part of the frame being removed. Fig. 2 is a similar front elevation of the right-hand end of the spinning-frame, portions of the framework being broken away to better show the traverse mechanism which governs the distribution of the spun material in the spinning-chambers and when subsequently wound upon the bobbins. Fig. 3 is an elevation of the left-hand end of the spinning-frame. Fig. 4 is a transverse vertical section on a line $X^4$, Fig. 2, with the spinning-chamber and the parts directly associated therewith at the front of the machine shown in elevation and the corresponding parts at the rear of the machine shown in vertical longitudinal section. Fig. 5 is a transverse vertical section on line $X^5$, Fig. 2, illustrating a portion of the traverse mechanism. Fig. 6 is a section on line $X^6$, Fig. 1, looking toward the left hand; Fig. 7, a section on line $X^7$, Fig. 1, looking toward the left hand. Fig. 8 is a section on line $X^7$, Fig. 1, looking toward the right hand. Fig. 9 is a sectional plan of the lower portion of the left-hand end of the spinning-frame. Fig. 10 is a sectional plan of the lower portion of the right-hand end of the spinning-frame; Figs. 11 and 12, details of the mechanism involved in performing the winding operation to be referred to. Fig. 13 is a longitudinal section of one of the spinning-chambers and parts coöperating therewith, illustrating the operation of the spinning appliances in twisting and coiling or collecting the twisted material. Fig. 14 is a transverse section thereof on the line $X^{14}$, Fig. 13, illustrating the operation of the spinning appliances in twisting and coiling or collecting the twisted material. Fig. 15 is a longitudinal section illustrating the beginning of the winding operation. Fig. 16 is a transverse section on line $X^{16}$, Fig. 15, illustrating the operation of winding the coiled material from the inside of the spinning-chamber onto a bobbin or other suitable support, the parts being shown in the position occupied at the beginning of the winding operation. Fig. 17 is a longitudinal section through one of the spinning appliances, illustrating the condition at the end of the winding operation, the filled bobbin being shown in elevation. Fig. 18 is a similar section showing the filled bobbin withdrawn from the spinning-chamber. Fig. 19 is a transverse section on line $X^{19}$, Fig. 18, illustrating the engagement of the yarn with the spinning-chamber preparatory to resuming the spinning operation after the previously-spun bobbin full has been withdrawn from the spinning-chamber. Fig. 20 is a longitudinal section of one of the spinning-chambers, illustrating the construction of its bearing. Fig. 21 is an underneath sectional plan thereof on line $X^{21}$, Fig. 20, showing the yarn-engaging device. Fig. 22 is a sectional detail of a portion of the bobbin-rail mechanism. Fig. 23 is a detail of the bobbin-rail pivot-axis. Fig. 24 is a detail showing the spinning-chamber rail in transverse vertical section and illustrating the manner of mounting or supporting the spinning-chambers on the rail. Fig. 25 is a detail showing a portion of the spinning-chamber rail in plan view, parts being broken away to illustrate the supporting connection between the spinning-chambers and rail and the manner of stopping the spinning-chambers individually when required. Fig. 26 is a sectional detail on line $X^{26}$, Fig. 25, of the devices for throwing the spinning-chambers into and out of operation individually. Figs. 27 and 28 are details of a circuit-closer for controlling a roving-breaking mechanism. Fig. 29 is a transverse section through a portion of the spinning-frame, showing the roving drawing-rolls and a roving-breaking mechanism. Fig. 30 is a detail thereof, showing the roving-guide in plan view. Fig. 31 is a detail showing the roving-clamp in side elevation. Fig. 32 is a detail showing the connection of the guide-eye supports with their rail. Fig. 33 is a transverse vertical sectional detail showing a portion of the take-up mechanism pertaining to the means for withdrawing the filled bobbins from the spinning-chambers. Fig. 34 is a detail of said take-up, showing the take-up roll in longitudinal section. Fig. 35 is an elevation of a portion of the left-hand end of the machine, showing part of the mechanism for automatically bringing the yarn-winding appliances into operation. Fig. 36 is a detail showing said mechanism in plan view. Fig. 37 is a sectional front elevation of the left-hand end of the machine, showing said mechanism. Fig. 38 is a diagram showing the electric circuit of the roving-breaking mechanism shown in Figs. 28 to 31.

The spinning apparatus forming the subject of this invention operates in accordance with a novel method of spinning and removing the spun material from the spinning appliances, which method forms the subject of another application for Letters Patent, Serial No. 92,990, filed February 7, 1902, and consists in the following steps: first, spinning and collecting the spun material in the form of a hollow coil by progressively supplying the material to be spun or twisted to a delivery-point and rapidly revolving a short length of said material after passing the delivery-point about said delivery-point and in confining the material after passing the delivery-point within a limited space around the delivery-point, and, second, in uncoiling said spun and coiled material and in the same operation winding it upon a core or support.

*Spinning-frame.*—In the spinning-frame herein shown the parts directly concerned in the operation of spinning and removing the spun material are shown in the proper operative relations to one another for spinning yarn from roving, and appliances are shown for giving the movements of the several instrumentalities in the proper relations to one another automatically; but it is obvious that the requisite movements of said parts may be produced in various ways not necessarily involving automatic mechanism and that the details of construction of the spinning-frame proper herein shown are not essential to the invention so far as it relates to the appliances directly concerned in the spinning and winding operations, the material elements of which might be embodied in various forms and arrangements, the character of which might vary according to the character of the material to be operated upon and the product desired, as spinning or twisting appliances constructed and operated in accordance with this invention may be employed for spinning or twisting various different materials to produce various products—such, for example, as yarn, thread, twine, &c. Figs. 1 to 38, however, illustrate a suitable arrangement and combination of the parts in a machine or spinning-frame in which the novel spinning appliances forming the subject of the present invention may be efficiently used for spinning cotton yarn of various qualities, either such as is used for the warp or such as is used for the filling of fabrics to be woven from the yarn, and the appliances illustrated for removing the spun yarn from the appliances directly concerned in the spinning operation are such that said yarn may be subsequently spooled or disposed of in any suitable or usual manner. The appliances are shown in this instance as properly arranged and operated to produce filling-yarn wound upon bobbins ready to be introduced into loom-shuttles to be woven into cloth.

For convenience the appliances which act directly upon the material in the spinning and winding operations will be first described, and thereafter the mechanisms for bringing the said parts into operation automatically at the proper times with relation to one another will be described.

The spinning-frame is provided with spinning appliances on both front and rear sides, and except for the handles to be manipulated by the operator in starting and stopping the machine the mechanism is substantially the same on the front and on the rear sides, so that the description will be confined mainly to the mechanism at the front of the machine.

*Spinning appliances proper.*—The spinning-frame illustrated in Figs. 1 to 10 is provided with the usual roving-spools 2, from which the roving may be taken by suitable or usual drawing-rolls 3, which may deliver the roving 4 (see Fig. 15) to the novel spinning appliances in the usual manner.

The active member 5 of the spinning appliances proper—that is, the spinning-chamber—may be sustained upon a suitable rail 6, and the material 4, delivered from the drawing-rolls, passes through a guide 7, which is supported from a rail 8, which may be given a traverse movement for distributing the spun material 9 (see Figs. 13 to 18) by any suitable or usual traverse mechanism, as will be hereinafter described—such, for example, as is used for traversing the ring-rail in a ring-spinning frame.

In the spinning-frame shown in Figs. 1 to 10, furthermore, the cop-tubes, bobbins, or supports upon which the yarn is finally wound for removal from the spinning appliances are supported upon a rail 12, operated by suitable mechanism, by which the cop-tubes or bobbins supported thereon may all be simultaneously projected into the interior of the several hollow spinning-chambers 5 and subsequently withdrawn therefrom.

The rail 8, that supports and operates the guide-eyes 7, is shown as supported on rods 13, that may be given an up-and-down traverse movement of any desired character by any suitable or usual mechanism operating upon the said rods, an example of which will be hereinafter described. Similarly the rails 12, that support and carry the bobbins or other supports upon which the spun material is wound from the interior of the spinning-chambers, are connected by brackets 14 with lifting-rods 15, which may be raised or lowered at the proper time by any suitable mechanism.

The construction of the appliances concerned in the spinning operation proper is best shown in Figs. 13 and 14. They comprise as the active member the hollow chamber 5, adapted to be rapidly rotated, and coöperating therewith the guide or delivery eye 7, which need not partake of the rotary movement. The guide 7 may be of any convenient construction, such that the material being spun may pass smoothly and freely through said guide at a point inside of the spinning-chamber, and may extend from said guide laterally to the wall of the spinning-chamber in any direction, so that the portion 40, extending laterally from the guide to the chamber, may be carried around the guide as a center of revolution, although said guide is not necessarily exactly concentric with or in the axis of the rotating spinning-chamber. A simple smooth-edged eye or loop capable of encircling the material being spun will serve well as the guide or it might be the end of a tube through which the material passes from the drawing-rolls, the essential guidance being only at the point from which the material passes laterally to the inner surface of the spinning-chamber.

As herein shown, the guide-eye is provided with a lateral opening through which the yarn or roving may be passed for convenience in threading or engaging the material with the eye, and the said eye is formed at the end of a supporting arm or rod 70, shown as detachably supported in a socket 71 on the guide-eye rail 8, (see also Figs. 32 and 38,) so that the operator may easily remove the guide-eye for convenience in introducing the material therein and thereafter may pass the said guide-eye, with the material therein, through the opening in the top of the spinning-chamber and then engage the guide-eye support 70 with its socket on the rail 8, which then sustains the guide-eye in proper position in the spinning-chamber during the spinning operation.

The socket on the guide-eye rail is dovetailed shape and tapered slightly from top to bottom, and the guide-eye support 70 is connected with a dovetailed-shape block to fit said socket and provided with a lateral finger 710 (best shown in Fig. 29) to prevent it from accidentally being thrown up too high in the operation of disengaging the guide-eye support from the rail.

The spinning-chamber 5 is shown in this instance as cylindrical in shape and of the desired length, which, as shown, corresponds substantially to that of the bobbins or spindles commonly used for spinning yarn of the same general character and for the same purpose. The said chamber 5 is shown in this instance as having a tubular neck 50 of smaller diameter, which forms the inlet-opening through which the material 4 being spun enters and also through which the support 70 for the guide 7 passes, the outer surface of said neck serving as the driving-pulley and being operated by a belt 20, (see Figs. 9 and 10,) driven by suitable pulleys 21 at proper speed, whereby the chamber 5 is rotated at high speed. The pulley 21 at the left-hand end of the machine (see Figs. 9 and 37) is fixed on a shaft provided with a driving-pulley 22, driven by a belt 23 from a suitable counter-shaft, which may be provided with a clutch or fast and loose pulley and clutch or belt shifter for starting or stopping all of the spinning-chambers together.

The bearing for the rotating chamber 5 is herein shown as so constructed, as will be hereinafter described in detail, as to afford only a very slight frictional resistance, and it has been found by actual test that it can be efficiently driven by a belt touching only on one side of the neck 50 and that the chambers can be rotated at a very high speed, (twenty thousand or more turns a minute,) thus giving much higher rate of production than the usual forms of spinning-spindles.

As shown in this instance, the spinning-chamber 5 is open at its lower end, this construction being adopted where it is used in combination with the winding-off appliances arranged as shown in the present embodiment of the invention, but not being essential to the spinning operation proper, the mode of operation of which will now be explained.

The material 4, delivered from the drawing-rolls 3, is passed through the guide-eye 7, and in starting the operation its end is brought against the inner surface of or engaged with the spinning-chamber 5, the rapid rotation of which in the direction of the arrow in Fig. 14 thus carries the short length of the material 40 between the guide-eye and chamber (see Figs. 13 and 14) around with the chamber, thus twisting the material extending from the inner surface of the chamber 5 to the point of issuance from the drawing-rolls 3, as will be readily understood. The centrifugal force acting upon the revolving short length 40 of the material extending laterally from the guide-eye 7 is sufficient to move forward the material as fast as it is supplied or fed from the drawing-rolls 3, and in proportion as the said material is supplied by the drawing-rolls it advances through the guide-eye 7 and is laid upon the inner surface of the spinning-chamber 5 or of the yarn already accumulated therein, the slight lag of the yarn (due to inertia, air resistance to the revolving part 40, and friction) causing it to be laid by centrifugal force uniformly around the interior of the spinning-chamber, and it is distributed along the length thereof, as desired, by a traverse movement of the guide-eye 7 inside of the spinning-chamber up and down in the direction of the axis of rotation, as will be readily understood.

The degree of twist put into the yarn depends upon the ratio of the speed of rotation of the chamber to the speed of feed movement or issue from the rolls at 3 and can be regulated with great nicety. It will be seen that the part of the material between the guide-eye 7 and the drawing-rolls is merely twisted on its own axis and is subjected to only the slight pull due to the centrifugal force on the lateral part 40 and that the resistance or drag upon the yarn is less in amount than is produced by the usual ring-and-traveler construction and more uniform, the result being that the spinning may be performed much more rapidly and that a more uniform quality of yarn is produced than is the case with ring-spinning.

*Roving-controller.*—The speed of production is so great that if the material should accidentally be broken between the drawing-rolls 3 and the spinning-chamber the roving would run out from the drawing-rolls so rapidly that it could not be taken care of by the lick-roll or felt-covered roll commonly employed for this purpose in ordinary spinning-frames. Furthermore, the conditions of operation are such that if the material should thus break it would be impracticable to piece it, and consequently the yarn which has accumulated in any spinning-chamber is wasted in the event of such breakage. Such breakages are very rare, however, as the material is subjected to only a very small stress between the drawing-rolls and the spinning-chamber; but in order to prevent damage and waste of roving in the rare cases in which such breakages occur and also to facilitate the piecing when first starting the spinning-chambers in operation if any piecing is then required the spinning-frame is provided with an automatic roving breaker and starter, the construction of which is best shown in Fig. 29. (See also Figs. 25 to 31 and Fig. 38.) The specific construction of this roving-controlling mechanism is not essential and is not of itself claimed herein; but a practical construction will now be described in order to afford a sufficient disclosure of a complete spinning-frame to enable the spinning appliances proper to be utilized to the best advantage.

There is one such roving-breaker mechanism pertaining to each spinning-chamber, and the said mechanisms are mounted each at the rear of the set of drawing-rolls pertaining to each spinning-chamber, being contained in a box or frame 80, supported upon the rods 81, extending along the spinning-frame upon which the roving-breaking mechanisms have a slight longitudinal traverse in order to distribute the wear more evenly along the surface of the rolls. The mechanism for driving the drawing-rolls and giving the roving-breaking mechanisms the traverse or reciprocating movement may be the same as commonly employed in spinning-frames to drive the drawing-rolls and reciprocate the roving-guides relative thereto and is not, therefore, herein shown and described in detail.

In connection with the set of drawing-rolls pertaining to each spinning-chamber there is an individual lick-roll 82 near the bottom rolls of the set and a movable roving-guide 83 above the rolls of the set, said roving-guide being movable toward and from the bite of the upper pair of rolls about a pivotal axis 84 and being provided with a detent arm or catch 85, adapted to be controlled by a detent 86, operated by the armature-lever of an electromagnet 87, the circuit of which (shown in diagram Fig. 38) is controlled by the material passing from the drawing-rolls into the spinning-chamber, the said circuit being closed and the magnet energized when said material breaks.

The roving-guide 83 is pivotally connected at 830 with the lick-roll carrier 88, which is provided at its lower end with bearings for the lick-roll 82 and with a handle near the lick-roll, which may be engaged by the operator when desired to operate the mechanism to start the roving. The said lick-roll carrier 88 is also connected by a link 89 with the framework 80 of the roving-breaker mechanism, the construction being such that when the roving-guide 83 is moved downward about its pivot 84 toward the bite of the upper rolls the lick-roll 82 is moved first downward and then rearward from its position (shown in dotted lines, Fig. 29) nearly between the lowermost drawing-rolls and against the inner one of said rolls to the position shown in full lines, Fig. 29, in which it normally stands while the spinning is going on. When the lick-roll is thus moved downward and rearward by the operator pressing backward on the handle at the end of the lick-roll carrier 88, the roving-guide 83 is at the same time brought down into the bite of the upper pair of rolls, so that the end of the roving which has been passed through the guide 83 will be caught by the rolls and immediately begin to feed downward through the several sets of drawing-rolls. When the lick-roll is thus pressed rearward and the roving-guide brought down to the upper rolls, the catch-arm 85 will be engaged by the detent 86, so that the parts will remain held in this position as long as the electromagnet 87 remains deënergized. A spring 90 (see Fig. 30, which shows said guide and its pivoted carrying-arm in plan view) tends to throw the roving-guide 83 upward and the lick-roll 82 forward and upward the instant that the catch-arm 85 is released by the detent, which occurs if the electromagnet 87 is energized.

The roving-guide 83 is provided with a movable clamping-finger 91, (see Figs. 30 and 31,) adapted to slide lengthwise of the guide-carrying arm and connected by a link 92 (see Fig. 29) with a pivot 93, so located relative to the pivot 84 of the roving-guide that when the latter moves upward the clamping-finger 91 is moved forward into the guide-passage and nips the roving, so that it breaks off between the guide and the upper pair of drawing-rolls and ceases to be supplied to the drawing-rolls, although a short length of roving is left hanging from the guide-eye ready to enter the drawing-rolls when the guide-eye is moved down toward the said rolls, as before described.

The link 92 is made in two parts, with an interposed spring 920, as shown, so that it will press the finger 91 yieldingly against the roving to clamp the same when the roving-guide is in its upper position, and there is lost motion shown as provided by the slot 95 in the clamping-finger, which is operated by a pin projection into said slot from the link 92, so that the finger does not pinch the roving until the latter part of the upward movement of the guide 83 and does not release the roving until the latter part of the downward movement, thus insuring that the guide in its downward movement may carry the end of the roving into the upper pair of drawing-rolls and then release it to again start the feed of the roving to the spinning appliances. The clamp is provided with a handle 94 at the front, as shown, so that it may be pushed back by hand at any time to release the roving or clear the guide-passage, so that the roving may be passed through it.

The mechanism is thrown into operation to break the roving by a circuit-closer 96, (see Figs. 27, 28, and 38,) supported upon the spinning-chamber rail 6 adjacent to each spinning-chamber, as shown in Figs. 24 and 25, said circuit-closer consisting of an arm which bears very delicately against the material 4 while being spun, which material prevents the said arm from coming in contact with the supporting-rod 70 for the guide-eye 7 so long as the material continues to feed properly to the spinning appliances. If, however, material is absent between the drawing-rolls and guide-eye, as in the case of the breakage of the material, the circuit-closer arm 96 will swing against and make electrical contact with the supporting-rod 70 of the guide-eye, and thus with the framework of the machine, which is connected with one terminal of the electromagnet 87, the other terminal of each of which magnets is connected by suitable insulated wires with the circuit-closer 96, corresponding to said magnet. (See Fig. 38.)

The construction of the circuit-closer 96 is shown in Figs. 27 and 28, and the mode of connecting the same with the rail 6 of the spinning-chambers is shown in Figs. 24 and 25. The said arm 96 is pivoted on a slightly-inclined axis in a small cup or cylinder 97, as shown in Figs. 27 and 28, and is provided with wings to check its pivotal movement, which may be resisted by a suitable fluid in the chamber 97. By reason of the inclined position of the axis the arm 96 tends to turn by gravity toward the yarn passing into the spinning-chamber, but bears only very lightly thereon, as is necessary because the yarn is under only very slight tension. The cylinder 97 is pivoted in a socket in the rail 6, as best shown in Fig. 24, said pivotal connection being properly constructed to insulate the circuit-breaker from the metallic framework of the machine. The said cylinder 97 is provided with an arm 98, by which the cylinder may be turned bodily in its socket, as indicated by the full and dotted line positions in Fig. 25, and when in the full-line position said arm bears upon and makes electric contact with the terminal of the wire leading to the electromagnet 87 of the roving-breaker mechanism corresponding to the spinning-chamber with which the circuit-closer 96 coöperates. Thus in the operation of piecing the roving for starting the operation of spinning if the roving pertaining thereto has been broken the circuit-closer can be turned to dotted-line position, Fig. 25, so as not to interfere with the operation of introducing the yarn into the spinning-chamber, and as soon as the yarn has been introduced, or after the roving has been pieced and the spinning operation started, the circuit-closer can be restored to normal position, (shown in full lines,) thus bringing the magnet of the corresponding roving-breaking mechanism under control of the material being spun in said spinning-chamber. The said circuit preferably includes an additional or secondary circuit-closer 99, (see Fig. 29,) which is retained closed by the supporting-arm of the roving-guide 83, when down in the normal position in which it stands while the roving is being properly fed to the spinning appliances. This secondary circuit-closer breaks the circuit immediately after the roving-breaking mechanism has been released by the electromagnet, so that the latter need not remain energized, as it otherwise would, so long as the circuit remains closed at the primary or controlling circuit-closer 96. A switch is also provided, as shown in Fig. 38, operated by the handle 19, that starts and stops the drawing-rolls, so that the circuit of all of the magnets is open when the drawing-rolls are stopped, thus preventing accidental release of any of the roving-breakers by the action of the electromagnets during the operation of winding the yarn onto the bobbins and removing the filled bobbins from the spinning-chambers.

*Starting the spinning.*—After the spinning operation has once been started there is no breakage or piecing of the material required under normal conditions. If, however, the material should accidentally break while the spinning operation was going on or in the operation of withdrawing the spun material from inside of the spinning-chambers, as will be hereinafter described, it will be necessary when next starting up to piece or connect the roving from the drawing-rolls down through the spinning guide-eye 7 to the interior of the spinning-chamber, which operation is greatly facilitated by the roving breaking and starting mechanism above described and may be performed as follows: At any spinning-chamber at which the yarn may have been broken a piece of yarn long enough to extend from the drawing-rolls to the spinning-chamber is passed by the operator through the guide-eye 7, which may be detached from the guide-eye rail 8 for that purpose, as before explained, and is then passed down through the spinning-chamber, which may be done by attaching a small weight to the lower end of the piece of yarn and lowering it through the spinning-chamber. This operation brings the yarn between the support 70 for the guide-eye and the circuit-closer arm 96, and thus opens the circuit of the electromagnet 87, so that it will remain in position to engage the catch-arm 85 of the roving-guide 83, or the circuit-closer may be turned by its arm 98 to keep the circuit open at this time, as before explained. The yarn hanging from the lower end of the spinning-chamber is then brought by the operator into engagement with the spinning-chamber, so as to be caused to revolve therewith, as will be hereinafter explained, and immediately thereafter the operator holding the upper end of the yarn in the fingers of one hand presses back the lick-roll 82 by the handle of its carrier 88, and thus causes the roving-guide 83 to carry the roving down to the drawing-rolls and release it, so that the rolls will instantly feed the roving therethrough. The operator catches the roving issuing from the lower rolls and with a quick twist of the finger pieces it to the yarn extending up from the spinning-chamber, and the spinning operation then immediately begins.

If the material should from any unusual cause happen to break while the spinning is going on, the roving-breaker mechanism will be released and the guide 83 and clamp 91 will break off the roving just above the rolls, while the lick-roll 82 will go forward and take up the short length of roving that was in the rolls at the moment when the roving was broken above the rolls, and the parts will remain in this position, as shown in dotted lines, Fig. 29, until the operator pieces up the roving the next time the spinning is started.

The armature-lever of the magnet 87 is extended down to a point below the drawing-rolls to afford a handle by which the operator may trip the roving-breaker into operation independently of the action of the electromagnet, if desired.

*Winding the yarn.*—When a desired quantity of yarn has been spun and laid or coiled upon the interior of the hollow chamber 5, as shown in Figs. 13 and 15, it must be removed therefrom, and in order to facilitate subsequent handling and to avoid the necessity of operations additional to those involved in the textile art as now practiced it is removed by uncoiling from the interior of the chamber and winding it into a ball or cop or winding it onto some support in the nature of a cop-tube, spool, or bobbin, and an important feature of this invention consists in the means employed for removing the material from the chamber or spinning mechanism proper.

A very convenient and efficient means for removing the spun material from the interior of the chamber, forming in combination with the said chamber a portion of this invention, will now be described in connection with a specific embodiment thereof which has been found to give excellent results. The means for thus removing the spun material comprises, primarily, a support which may be a simple dead-spindle or skewer or may be provided with a cop-tube, bobbin, or spool, according to the use to which the spun yarn or twisted material is to be put, said support being introduced into the rotating chamber in such manner as to have some portion thereof come into engagement with the rapidly-revolving short length 40 of the material between the guide-eye 7 and the interior of the chamber or mass of yarn 9 collected therein after the main portion of said support has been passed through the mass of material inside of the chamber, so that the support extends through the entire length of said rotating coiled mass of spun material.

In the specific construction herein shown, in which the spinning-chamber 5 is open at both ends, the support 16 on which the yarn is to be wound is inserted through the lower end of the chamber by the upward movement of the rail 12, carrying said support, this movement taking place or being completed substantially while the eye 7 is at or a little above the upper end of its traverse in spinning, so that before the upper end of the support 16 upon which the yarn is to be wound reaches the level of the guide-eye 7 the support is carried up and extends through the entire length of the mass of yarn collected and coiled on the inside of the spinning-chamber, as shown in Fig. 15. There will of course be one support 16 for each spinning-chamber 5, and the series of supports corresponding to the series of chambers at one side of the spinning-frame are all carried by the rail 12, so that the yarn may be wound on said supports and removed from all the chambers simultaneously by a single series of operations. In the spinning-frame herein represented the support upon which the yarn is wound is in the form of a filling-yarn bobbin adapted to be used in a shuttle, and in the further description of the operation of removing the yarn from the chamber 5 the support upon which the yarn is wound will be called a "bobbin," although it is to be understood that this part of the invention is not limited to the specific form of bobbin shown or to any special form of support.

The bobbin 16 is provided at its upper end with an engaging point or projection 17, (see Fig. 16,) shown as formed by a notch in the edge of the base of the bobbin, which projection is so located as to come between the eye 7 and the wall of the spinning-chamber 5, as shown in Figs. 15 and 16. The said engaging point about as the eye 7 has reached the upper limit of its traverse movement is carried sufficiently high to engage the revolving portion 40 of the material between the eye 7 and the wall of the chamber, as shown in Figs. 15 and 16.

Just before the point 17 arrives in proper position to engage the yarn the operation of the drawing-rolls 3 is stopped, so that no more roving is supplied to be spun, and consequently the longitudinal movement of the yarn extending from the drawing-rolls through the eye 7 ceases. The eye is at this time drawn up beyond the highest position of its normal traverse. The projection 17 then passes above the eye 7, as shown in Fig. 15, and engages the revolving portion 40 of the material, Fig. 16, so that by the continued rotation of the chamber 5 the yarn therein is wound around the bobbin 16. The yarn passes across from the interior of the coiled mass to the outer surface of the bobbin, or of the material that has up to any given moment been wound thereon, and is thus distributed along the length of the bobbin in accordance with the distribution along the inside of the chamber, as determined by the traverse movement of the eye 7 in the spinning operation.

Each rotation of the chamber will wind onto the bobbin more than one turn of yarn, and by reason of the high speed of the chamber the yarn will be wound upon the bobbin in a very short time, so that although this winding is intermittent with the spinning the spinning operation is only very slightly delayed or interrupted and the rotation of the spinning-chamber need not be stopped or retarded at all. In practice, however, it is more convenient to stop the rotation of the spinning-chambers or to disconnect the driving power therefrom after the bobbins are filled and to restart them when the filled bobbins are withdrawn from within the spinning-chambers. After the yarn has thus been wound onto the bobbin, as shown in Fig. 17, the latter is lowered out of the chamber 5, which is done by the operator preparatory to restarting the spinning operation, as will be hereinafter described.

*Take-up.*—In order to avoid breakage of the yarn between the drawing-rolls and the bobbins while thus lowering the bobbins out from the spinning-chambers, and thereby to avoid the necessity of piecing the rovings or of passing the material through the guide-eyes 7 when the spinning operation is resumed, a take-up device is provided between the drawing-rolls and the spinning-chambers, which operates to take up a portion of the material between the drawing-rolls and the spinning-chambers immediately before the operation of winding onto the bobbins begins and which gives out the said material while the bobbins are being lowered, so that the material will extend without being strained from the drawing-rolls down through the spinning-chambers and guide-eyes therein to the bobbins when below the spinning-chambers, as shown in Fig. 18, it being understood that the drawing-rolls cease running before the winding operation begins and are not started again until the spinning operation is again resumed after the wound bobbins have been withdrawn from the spinning-chambers. This take-up mechanism, as shown in this instance, comprises a roller 30 in the form of a tube extending along the spinning-frame just above the spinning-chambers and in front of the material 4, passing from the drawing-rolls to the spinning-chambers. At each spinning-chamber the said take-up roll 30 is provided with a guide upon its periphery through which the material passes on the way to the guide-eye 7 of the spinning appliances. Said guide is shown as formed by a slide 32, (see Fig. 34,) extending over a groove 31 in the side of the roll 30, which slide is moved aside to permit the material to be passed into the groove and is then slid back, so as to confine the material in the groove, through which it may pass freely on the way from the drawing-rolls to the spinning appliances. The slide is moved back by a spring 33, (see Fig. 34,) extending across the bore of the tubular take-up roll and projecting from the slide to serve as a handle therefor. The said take-up roll 30 is mounted in arms 34, (see Fig. 33,) pivoted at 35 and provided with a weight 39, tending to lift the roll 30 when released by mechanism provided for that purpose, that will be hereinafter described. The said roll 30 when thus lifted travels upward in an arc-shaped guide 36, provided upon one side with gear-teeth 37, which mesh with a pinion 38 upon the roll 30, so that as the latter moves upward it is also rotated upon its axis, and thus winds the material extending from the drawing-rolls down to the said take-up roll around said take-up roll in proportion as the latter rises, as shown in Figs. 15 and 17. The take-up roll in rising thus draws back and upward a portion of the spun material from inside of the spinning-chamber, said material passing back freely through the guide-eye 7 and winds the said material around the take-up roll, this being done immediately after the drawing-rolls are stopped and producing no strain upon the material between the drawing-rolls and the spinning-chambers and leaving no slack in said material, although there is a greater length of the material than required to reach from the drawing-rolls to the spinning-chambers, which extra length has been wound around the take-up roll.

When the bobbin-rail 12 is lowered in order to remove the filled bobbins from within the spinning-chambers, as before described, the take-up roll 30 is correspondingly lowered by connections that will be hereinafter described and in moving down unwinds the yarn which has been wound about it in proportion as the bobbin moves down, so that at the end of the downward movement of the bobbin the yarn stands straight, but without strain, from the drawing-rolls down through the guide-eyes 7 and spinning-chambers to the bobbins below the spinning-chambers, as shown in Fig. 18. With the parts in this condition the yarn may be broken immediately above the bobbin and engaged with the spinning-chamber and will thus be left in proper condition for resuming the spinning operation. In order to facilitate the operation of thus breaking the yarn and connecting it with the spinning-chamber and to perform this operation simultaneously at all of the spinning-chambers on the frame, the bobbin-rail 12 is tipped forward upon its pivotal connection with the brackets 14 before mentioned to the position shown in dotted lines, Fig. 18, (see also Fig. 22,) thus drawing the yarn leading from the upper end of each bobbin against the lower edge of the spinning-chamber, which has been set in rotation before the bobbins are thus tipped forward on the bobbin-rail. In order to insure the breakage of the yarn below the spinning-chamber and guide-eye 7 therein and to insure the engaging of the yarn with the spinning-chamber so that it will be revolved thereby to perform the spinning operation, the said spinning-chambers are each provided with an engaging device 51, shown as a finger yieldingly supported on the inner surface of the lower edge of the chamber by a spring, which when the parts are at rest stands a little way off from the wall of the spinning-chamber, as shown in dotted lines, Fig. 21, but is thrown firmly against it by centrifugal force when the spinning-chamber is rotating.

When the yarn is drawn against the lower edge of the chamber by the tipping forward of the bobbin, as before described, the holding-finger 51 will seize the yarn, as shown in Fig. 19, and instantly break it off between the said holding-finger and bobbin and will carry the end of the yarn thus seized around with the spinning-chamber, and thus cause the spinning operation to begin the moment the drawing-rolls begin to feed the roving. The drawing-rolls should be started by the operator as soon as possible after the bobbins are thus thrown forward, this being done as will be described hereinafter. In this way the spinning operation is started simultaneously at all of the spinning-chambers and the filled bobbins are brought to convenient position to be doffed or withdrawn from the skewers by the operator and replaced by empty bobbins, after which the rail 12 is tipped back to its normal position with all the empty bobbins standing below and in line with the axes of the chambers ready to be raised by the rail 12 for the next winding operation.

It is obvious that so far as the invention relates to the coöperation of the devices directly involved in the spinning or twisting operation and in removing the spun or twisted materials from the spinning-chambers as thus far described it is immaterial what means are employed for bringing the essential working elements into the proper operative relations to one another at the proper times and that if, for example, the operation of raising and lowering the bobbin-rail 12 were performed by the operator by hand the spinning might be performed very rapidly and efficiently; but these operations may be performed automatically by suitable connecting mechanism in the spinning-frame provided for that purpose, as will be hereinafter described.

It is also obvious that various other arrangements might be employed for performing the operations thus far described and that the spinning-chamber and instrumentalities directly coöperating therewith might be varied widely in details of form and construction. The construction and arrangement hereinbefore described, however, is very efficient for spinning cotton yarn, producing yarn from given material of much better quality and with much greater rate of production than is attainable by the spinning machinery now in commercial use.

*Bearing for spinning-chamber.*—It is not essential that the spinning-chamber should be open at both ends, as a single axial opening is sufficient both for the entrance of the yarn in the spinning operation and for the winding and removal of the yarn when spun. The arrangement, however, by which the bobbins or supports upon which the yarn is wound are introduced into and removed from the chamber at the opposite end to that through which the material enters in being spun possesses advantages and is believed to be the best construction in the majority of cases. This construction necessitates that the bearing for the spinning-chamber shall be of comparatively large diameter, and while the bearing for supporting the spinning-chamber may be constructed in any suitable or usual manner the present invention includes a very efficient bearing for providing for the rapid rotation of said chamber with a minimum amount of frictional resistance and consumption of power which will now be described, the construction being best shown in Figs. 20 and 24. In this construction the spinning-chamber while running is kept entirely separate from the supporting-bearing member by a film or body of air, which serves as a lubricant and prevents metallic contact between the moving and stationary members of the bearing by which the spinning-chamber is sustained on its supporting-rail 6. This air-lubricated bearing comprises two components, one of which serves to confine the spinning-chamber or rotating part laterally or against deviation in a direction radial to the axis of rotation and will be called the "bolster-bearing" and the other of which serves to sustain the weight of the spinning-chamber (which is shown as rotating on a vertical axis) and will be called the "step-bearing."

The bolster-bearing consists of a tubular shell 52, (see Fig. 20,) which surrounds the cylindrical body 5 of the spinning-chamber proper. The internal diameter of said shell must be only a very little larger than the external diameter of the corresponding portion of the spinning-chamber, so that when the two are coaxial there is only a small clearance between them. In practice it has been found that a difference of diameter of fifteen ten-thousandths of an inch gives good results. With this construction the rapid rotation of the spinning-chamber causes air to travel around between the bearing members and to be compressed at any point where the rotating chamber approaches the shell nearer than the normal or average distance and at the same time causes the air film to be rarefied where the chamber recedes from the shell farther than the normal distance. These two points are diametrically opposite to each other. This results in a greater air-pressure on one side of the rotating chamber and a less air-pressure on the opposite side relative to the normal or atmospheric pressure, and thus tends to force the rotating chamber into concentric position in the outer bearing member or shell 52, and consequently the chamber is prevented from coming at any time into metallic contact with said shell, so that the only resistance to its rotation is the air resistance, and this is so slight that it does not cause any objectionable heating of the parts with the highest speeds tested, which are not less than twenty thousand revolutions to the minute.

The step-bearing for supporting the weight of the rotating chamber or preventing endwise displacement thereof may be provided by forming the outer bearing member 52 with a flange or shoulder 53 and the inner bearing member—i. e., the spinning-chamber itself— with a corresponding flange or shoulder 54, so that slightly-compressed air introduced between the said shoulders will separate them and will support the weight of the chamber. In order conveniently to control the introduction of compressed air thus to support the spinning-chamber, the latter is provided with a short tubular portion 55 above the flange 54, which is surrounded by a corresponding tubular portion 56 of the outer shell 52 with an intervening clearance or space substantially like that between the main body of the spinning-chamber and the outer shell 52. The inner member 5 is provided with a peripheral groove 57, communicating with the space between the shoulders 53 and 54 on thes pinning-chamber and shell, said groove being formed in the body portion of the chamber 5 just below the flange 54.

The outer bearing member or shell 52 is provided with an air-inlet 58, connected with a suitable source of air under pressure, which pressure need be only slightly (approximately a pound) above atmospheric. Said inlet 58 is upon a level with the groove 57 in the spinning-chamber when the shoulder 54 of the latter is resting upon the shoulder 53 of the shell 52, so that in this position air will pass freely to the space between the shoulders 53 and 54 and by its pressure will separate them and support the spinning-chamber. When the spinning-chamber has been slightly lifted, the groove 57 will pass above the air-inlet 58, and thus close the same and cut off further admission of air into the groove and space between the shoulders 53 and 54, so that the lifting action will cease, and thereafter air will be admitted to the space between the shoulders 53 and 54 only in proportion as it leaks or escapes through the space between the cylindrical portions 55 56. The compressed air thus automatically sustains the spinning-chamber with its shoulder 54 out of contact with the supporting-shoulder 53 on the shell.

The air-inlet of the bearing for each spinning-chamber may be connected by a flexible pipe, as shown at 59, Fig. 24, with an air-pipe 60 (see Fig. 8) on the supporting-rail 6 for the spinning-chambers, said pipe being connected with a suitable air-supplying apparatus adapted to maintain a supply of air at sufficient pressure to sustain the spinning-chambers.

The outer member 52 of the bearing for each spinning-chamber is, as shown in this instance, supported upon the rail 6 by a pivotal connection which permits the bearing and spinning-chamber therein to be moved with reference to the driving-belt 20, (see Fig. 25,) so that the neck 50 may be pressed against said belt to receive motion from it or may be withdrawn therefrom to throw it out of operation, if need be. In the specific construction herein shown and best illustrated in Figs. 24 to 26 the rail 6 is provided with lateral projections 61 above and below the spinning-chambers, said projections being above and below the level of the spinning-chambers and located between the chambers, as best shown in Fig. 25, so as to afford access to the openings in the top and bottom of the spinning-chambers.

The outer member 52 of the bearing for each spinning-chamber is pivotally connected with the projections 61 of the rail 6 at a point near one side of the spinning-chamber by arms 62 63, shown as connected with rings 64 65, embracing and carrying the outer member 52 of the bearing near its upper and lower ends. For convenience in construction the said arms 62 63 are made in separate pieces from the rings 64 65 and are rigidly connected therewith, so that the arms themselves may lie above and below the ends of the spinning-chamber, and the outer bearing member may be pivotally connected with the rail projections at 66 (see Fig. 24) to turn bodily on an axis near the outer periphery of the outer bearing member 52. A spring 67 (see Fig. 25) engages with an arm 68, fixedly connected with the hub of the upper pivotal arm 62, and tends to throw the bearing and spinning-chamber contained therein rearward from the rail 6, so that the neck 50 of the spinning-chamber is yieldingly pressed against the driving-belt 20, so that such a driving-belt extending along a row of spinning-chambers and running against idlers 25, as shown in Fig. 9, will efficiently drive all of them. The arm 68, connected with the spinning-chamber and its bearing, as above described, is also arranged to be operated by a shifting arm or handle 69, provided with an eccentric portion or cam 690 to act on said arm 68, as best shown in Figs. 25 and 26, by which the corresponding spinning-chamber may be turned upon its pivotal support at 66 on the rail 6, so as to throw the neck 50 of the said spinning-chamber away from the belt 20, and thus allow the said spinning-chamber to cease rotating. The lowermost one of the spinning-chambers represented in Fig. 25 is shown as thus thrown out of engagement with the driving-belt 20 and stopped. A brake 24 is provided, against which the neck 50 of the spinning-chamber is pressed when thus stopped individually by disengaging it from the driving-belt. When it is desired to restart a spinning-chamber that has thus been stopped individually, it is necessary only to turn the handle 69, so as to remove its cam portion from the arm 68, when the spring 67 will move the spinning-chamber and its bearing around their pivotal support at 66 on the rail 6 and yieldingly press the neck 50 of the spinning-chamber against the belt 20, so that the spinning-chamber will again be caused to rotate.

*Automatic connecting mechanism.*—While the invention, so far as it relates to the construction and mode of operation of the spinning and winding appliances hereinbefore described, is not limited to any specific mechanism for giving the parts the requisite relative movements for their coöperation, the invention also comprises certain mechanical combinations by which such movements are produced automatically at the proper times, which combinations will now be described. To facilitate the understanding of this part of the machine, the order of the operations as performed in the machine herein shown will first be briefly summarized and then the mechanism concerned in each operation will be described.

In Fig. 4 the parts are shown in the position occupied at the completion of a spinning and winding operation with the spun material wound upon the bobbins, the parts having been brought to this condition automatically and the mechanism then completely stopped. The machine is thus stopped with the bobbins in their elevated position, (shown also in Figs. 15 and 17,) and thereafter the operations of starting the machine are performed by the attendant properly manipulating the handles shown at the left hand in Fig. 1, the parts being shown in said Fig. 1 in the position assumed just as the operator has performed the first necessary operation—viz., that of lowering the filled bobbins from the interior of the spinning-chambers—which operation by suitable connecting mechanism returns the take-up roll 30 to its original position, and thereby pays out the yarn enough between the drawing-rolls and the end of the filled bobbin to enable the bobbins to be lowered without danger of breaking the yarn, as before explained in connection with Figs. 17 and 18. When the bobbins have been lowered to the position shown in Figs. 1 and 18 by the operator acting upon the handle 11, the operator next starts the rotation of the spinning-chambers (if they are not already running) by the shipper-handle 18, which may be moved to the position to start the said appliances at low or at high speed, according to the desire of the operator. When the spinning-chambers have been started, the operator by further depressing the bobbin-handle 11 swings the bobbins forward to the position shown in dotted lines, Figs. 18 and 22, thus causing the yarn just above the bobbin to be engaged by the catch 51 in the rotating spinning-chamber, which instantly breaks off the yarn between the catch and the bobbin and sets the yarn between the catch and the guide-eye revolving. At about the same time that the yarn is thus broken and the twisting of the yarn above the break is begun the operator starts the drawing-rolls 3 by the roll-handle 19, so that the spinning is now resumed. If the yarn has in any case been broken between the spinning-chamber and the rolls, it will be necessary to piece it at this spinning-chamber, which will be done by the attendant manipulating the roving breaker mechanism, as hereinbefore described.

The spinning having thus been started, the operation will go on and the yarn will be properly distributed or built inside of the spinning-chambers by the traverse mechanism, parts of which gradually change position as the building goes on, and may thus be employed to start the automatic mechanism for winding the spun and coiled material when sufficient has been accumulated to properly fill the bobbins.

The succeeding operations involved in the winding are performed by mechanism operated by a cam-shaft controlled by a clutch which is brought into operation by the traverse mechanism when the spinning-chambers have been properly filled. This cam-shaft controls a mechanism which lifts the bobbin-rail to raise the bobbins into the interior of the spinning-chambers. This bobbin-lifting mechanism is also combined with or includes connecting mechanism between the bobbin-rail and the guide-eye rail such as to give the bobbin and guide-eye the proper relative movement, as hereinbefore described.

Another mechanism controlled by the cam-shaft is a stop mechanism for the drawing-rolls and also for controlling the take-up device or roll 30, these parts being so timed with relation to the bobbin-rail-lifting mechanism that the drawing-rolls first stop, and the take-up roll 30 then acts to take up some of the yarn from within the spinning-chamber just before the bobbin passes the guide-eye 7, so as to engage by its notch or point 17 the material between the guide-eye and the interior of the spinning-chamber to cause the latter to be wound upon the bobbin by the rotation of the spinning-chamber. The parts remain in this position long enough to afford time for the yarn to be wound upon the bobbins, this commonly taking from half a minute to a minute, and then the cam-shaft operates the shipper or clutch-controller which disconnects the power from the spinning-chambers, so that the machine comes to rest with the filled bobbins standing inside of the spinning-chambers, as shown in Fig. 4, the parts being ready to be again started by the operator manipulating the handles 11, 18, and 19, as before described.

The mechanisms concerned in the foregoing operations are as follows:

*The traverse mechanism.*—The traverse mechanism is best shown in Fig. 2 and is of the same character as commonly employed for traversing the ring-rail of a ring spinning-frame. It derives its motion from the belt 100, Figs. 1 and 3, which drives the shaft 101, extending substantially the entire length of the frame and provided near the right-hand end of the frame with a worm 102, (see Figs. 5 and 10,) meshing with a worm-gear 103 on a short shaft provided with a pinion 104, meshing with a gear 105 (see Fig. 2) on a shaft carrying the cam 106, which imparts the traverse motion to the guide-eye rail 8. Said cam 106 acts upon a roller 107, connected with a lever 108, fulcrumed at 109, which lever is thus vibrated up and down slowly as the cam 106 rotates. This vibration of the lever by suitable connections imparts the movement to the guide-eye rail which causes the yarn to collect in suitably-arranged layers within the spinning-chambers, as indicated in Figs. 13 and 15.

In order that the layers may be of less length than the spinning-chambers and the bobbins, but may be distributed so as to finally cover the entire length of the spinning-chamber to a uniform thickness along the middle portion, as is required for the filling to be used on shuttle-bobbins, the connection between the vibrating lever 108 and the guide-eye rail 8 is as follows: Said lever 108 has pivotally connected therewith an arm 110, capable of pivotal movements with relation to the lever about the pivotal connection 111. The said arm 110 engages with a roll or projection 112, carried by the lever 108 in its vibrating movement, but adapted to be shifted along the said lever in order to vary the position of the arm 110 relative to the lever. The said arm 110 is connected by a chain and rod 113 with an arm 114, (see Fig. 1,) connected with the rock-shaft 115, carrying the arm 116, provided with a roll 117, which acts upon the foot of the rod 13, (see Fig. 4,) connected with the guide-eye rail 8, so that the said guide-eye rail receives an up-and-down reciprocation corresponding to the vibratory movement of the lever 108, caused by the cam 106.

While the extent of the traverse motion of the guide-eye rail is practically constant, the position of the guide-eyes in their traverse movement is gradually shifted from near the bottom toward the top of the spinning-chambers by gradually letting out the chain 113 relative to the lever 108, which is done by the movement of the arm 110 relative to the lever 108. This movement of said arm 110 results from the shifting of the roll 112 along the lever 108, as follows: Said roll 112 is carried by a slide 120, adapted to travel in a guide lengthwise of the lever 108 and provided with a toothed segment meshing with a worm or screw 121, carried by the lever 108 and provided at its ends with a ratchet 122. (See Fig. 5.) Said ratchet is intermittingly rotated by a pawl 123, supported in a pawl-carrier 124, loose on the shaft 125 of the worm 121, which pawl-carrier in the upward vibration of the lever 108 engages with a fixed stop 126, which arrests the upward movement of that end of the pawl-carrier and causes the pawl in the farther upward movement of the lever 108 to rotate the ratchet and worm 121 so as to feed the carriage 120 a short distance toward the fulcrum 109 of the lever 108, thus allowing the arm 110 to rise a little relative to the lever 108 and through the connections before described causing the guide-eye rail to rise a corresponding amount. This operation goes on slowly and intermittingly feeds the carrier 120 toward the fulcrum of the lever 108 a short distance at each up-and-down traverse movement, and thus gradually raises the guide-eye rail step by step in its traverse movement until the spinning-chambers have been properly filled, and when the movement of the carrier 120 has been carried far enough to bring the traverse of the guide-eyes 7 into the upper part of the spinning-chambers 5, which have at this time become properly filled, the said carrier calls into action the automatic mechanism for effecting the winding of the accumulated material upon the bobbins and the stopping of the machine. This is done by a tripping device 127, supported on the carrier 120, which when the carrier has approached the fulcrum 109 of the lever 108 sufficiently engages a detent 130, connected by a rod 131 with one arm of an elbow-lever 132, the other arm of which is connected by a link 133 with an arm 134 on a rock-shaft, having another arm connected by the rod 135 (see Figs. 1 and 2) with the trip mechanism for the clutch 150, (see Figs. 1 and 3,) that controls the automatic mechanism for governing the winding operation.

The driving member of said clutch 150 is connected by sprockets and a chain 151 with the shaft 101 of the traverse mechanism, and when said clutch 150 has been engaged it causes the actuating-shaft 152 of the automatic winding mechanism to be put in operation.

*Clutch mechanism.*—The mechanism for controlling the clutch that causes the winding mechanism to be set in operation is best shown in Figs. 35, 36, and 37, Fig. 35 showing the same parts as appear in Fig. 3, but on a larger scale.

Referring to Fig. 36, which is a sectional plan of the mechanism shown in Fig. 35, the trip-rod 135, which is operated by the traverse mechanism when the traverse reaches the upper part of the spinning-chamber, as above described, is connected with an arm 136, provided with an engaging hook 137, which engages the arm 138 of the bent lever, which arm serves as a detent for one arm, 139, of a bent lever, the other arm, 140, of which engages with an arm 141 on a rock-shaft provided with a fork 142', (see Fig. 35,) connected in the usual way with the movable member of the clutch 150, which is splined upon the shaft 152, and therefore drives the said shaft when the movable clutch member is engaged with the other clutch member, which is driven by the sprocket-chain connection from the shaft 101 of the traverse mechanism, as before described.

The arm 139 is acted upon by a stout spring 143, so that when said arm is disengaged from the arm 138 the spring promptly throws it in the direction to connect the members of the clutch 150 and causes the shaft 152 to be driven.

The arm 141, connected with the clutch, is provided with a locking-ratchet 144, which is engaged by a pawl 145, which will thus retain the clutch engaged, even though the engaging lever 139 140 is restored to the original position. (Shown in Fig. 36.)

The clutch is automatically disengaged after the actuating-shaft 152 has produced the cycle of movements necessary for the winding of the yarn by mechanism best shown in Fig. 36. The cam-shaft 153, which makes one revolution to produce the operations necessary for winding the yarn onto the bobbin, is provided with a cam projection 146, which near the end of the revolution of the cam-shaft engages a lever 147, connected with the arm 139, and forces said arm back against the stress of its spring 143 to the position shown in Fig. 36, in which it is engaged and held by the arm 138, as shown in said figure. This operation disengages the arm 141, connected with the clutch, which is, however, still retained in driving position by the holding device 145.

A second cam 148 acts upon an arm 149, connected by a link 72 with the catch 145, which is thus withdrawn from engagement with the ratchet 144, thus releasing the arm 141, connected with the shifting clutch member by the yoke 142, and when thus released the spring 73 disengages the clutch, so that the actuating-shaft for the winding mechanism ceases to run and will not be set in operation again until the next time that the clutch mechanism is tripped by the operation of the rod 135 from the traverse mechanism. The spring 143, which causes the clutch to be thrown into engagement, is of course powerful enough to overcome the spring 73, which tends to throw it out of engagement and which can do so only after the spring 143 has been overcome and reset by the cam 146, thus leaving the clutch free to be disengaged upon tripping of its latch 145 by the cam 148, which is set to operate a trifle later than the cam 146.

The tripping-arm 138 is connected with a second arm 74, (see Fig. 36,) adapted to be acted upon by a cone or wedge 75, connected by a rod 76 with the handle 26 (see Figs. 1 and 3) at the extreme left of the machine, (marked "Doffing,") which may be employed by the operator if for any reason it should be necessary or desirable to throw the winding mechanism into operation before it is automatically brought into operation by the traverse mechanism, as has been described.

The starting and stopping of the actuating-shaft 152 is thus effected automatically, and said shaft in its period of operation causes the several operations required for winding the yarn onto the bobbins to take place, the first of said operations being the lifting of the bobbin-rail to carry the bobbins into the spinning-chambers.

*Bobbin-rail-lifting mechanism.*—Said actuating-shaft 152 drives, through beveled and worm gearing, (best shown in Fig. 7,) the cam-shaft 153, which by gearing 154 (see Figs. 6 and 37) drives a second cam-shaft 155 at a higher speed, said cam-shaft 155 being arranged to make two or more rotations during one rotation of the cam-shaft 153. The said faster-moving cam-shaft 155 is provided with a cam 156, which acts upon a roller 157, connected with a link or slide bar 158, connected with an arm 159 from the rock-shaft 160, provided with the handle 11, that serves to operate the bobbin-rail 12 by hand when required. The said shaft 160 is also provided with an arm 162, (see Figs. 1 and 37,) connected by a link 163 with an arm 164, fixed on the rock-shaft 165, provided with another arm 166, (see Fig. 1,) having a roller that coöperates with the lifting-rod 15 for the bobbin-rail. Thus the rotation of the cam 156 causes the bobbin-rail to be raised to carry the series of bobbins supported thereon up into the spinning-chambers, as shown in Figs. 15 and 17.

It is necessary for the proper performance of the winding operation that the bobbins should not engage the revolving short length 40 of the material being spun until the bobbins have passed substantially wholly through the accumulated spun material or, in other words, until the upper ends of the bobbins have risen to the level of the uppermost coil of the material accumulated in the spinning-chambers. It is therefore necessary that the guide-eyes should be retained above the upper end of the bobbins until the latter have risen substantially to the top of the accumulated material, after which the upper end of the bobbin should rise slightly above the guide-eye (or the guide should drop slightly with relation to the bobbin) in order to engage the revolving short length 40 of material between the guide-eye and the wall of the spinning-chamber—that is, the end of the bobbin, with its engaging point 17, should have passed the guide-eye, as shown in Fig. 15, when the latter is at or just above its highest position in the traverse by which the spinning-chamber was filled. In order to insure this relation, the bobbin-rail-lifting mechanism also controls the guide-eye rail, as follows: The guide-eye rail is provided with additional lifting-brackets 170, (see Figs. 1 and 4), coöperating with additional lifting-arms 171, (see Fig. 1,) which may lift the guide-eye rail off from the rollers 117, that control it in its traverse movement. Said additional lifting-arms 171 are supported upon rock-shafts 172 and extend beyond the rock-shaft, as shown at 173, and are there adapted to be engaged and lifted by a projection 174, (see Figs. 11 and 12,) carried by a rod 175, connected with an arm from the rock-shaft 165 of the bobbin-rail-lifting mechanism. Thus in the latter part of the lifting movement of the bobbin-rail the guide-eye rail will also be engaged and carried upward by the said bobbin-rail and maintained at a distance therefrom sufficient to keep the guide-eyes sufficiently above the upper ends of the rising bobbins to prevent the latter from engaging the portion 40 of the material.

As soon as the upper ends of the bobbins have risen to the upper end of the accumulated material a tripping mechanism (shown in Figs. 11 and 12) comes into action and permits the guide-eye rail to come a little nearer the bobbin-rail, so that the ends of the bobbins rise sufficiently relative to the guide-eyes 7 to engage the revolving short length 40 of material between the guide-eye and the wall of the spinning-chamber, as shown in Fig. 15, when the continued rotation of the spinning-chamber will cause the material to be wound upon the bobbin, as before explained. The construction of the said tripping mechanism is as follows: The projection 174, actuated by the bobbin-rail-lifting mechanism, is arranged to have a short sliding movement upon the rod 175 and is normally held in its lower position on said rod by a latch 176, (see Fig. 11,) made in the form of an elbow-lever, pivoted in a bracket adjustably fastened to the upper end of the rod 175. A stop 177, connected with the framework and shown as made in the form of nuts adjustable on a rod hanging from the rock-shaft 160, engages the lateral arm of the latch 176 just as the bobbins rise to a proper height to have the coiled material wound upon them, as shown in Fig. 15. The tripping of the latch 176 permits the projection 174 to rise to the limiting-stop 178 on the rod 175, preferably shown as adjustable, this rise of the projection 174 permitting the guide-eye rail to relatively descend a corresponding amount by gravity, and the amount of such movement being adjusted by the projection 178 so as to be just sufficient to cause the guide-eyes to descend into the bobbins a trifle below the upper ends thereof, so that the engaging point or notch 17 on each bobbin will with certainty engage the revolving short length 40 of the material. Just before this occurs, however, or, in other words, before the catch 176 reaches and is acted upon by the tripping device 177, the drawing-rolls are stopped, and the take-up device, acting upon material between the drawing-rolls and the spinning-chamber, is called into action as follows:

*Drawing-roll stop and take-up mechanism.*—The drawing-rolls are stopped by the action of a cam projection 180 (see Fig. 7) on a cam carried by the more rapidly moving cam-shaft 155, which projection engages a roller 181 on a rod 182, connected with an arm 183 (see Fig. 37) from the rock-shaft 184, provided with another arm, connected by rod 185 (see Figs. 1 and 3) with one arm of a bell-crank lever 186, the other arm of which controls a clutch 187, connecting the driving-shaft of the drawing-rolls with its actuating-belt pulley. The said rod 182, operated by the cam 180, is also connected with the hand-operated handle 19, by which the drawing-rolls may be started and stopped by hand when required. The upward movement of the rod 182, which disengages the clutch 187, and thus stops the drawing-rolls, causes the handle 19 to be moved down to its lowest position, in which it is retained by a catch 188, Fig. 7, thus keeping the clutch disengaged until the handle 19 is operated by hand to start the rolls for the next spinning operation. The rod 185 is also arranged to engage with an arm 191 on a rock-shaft 192, provided with an arm 193, (see Figs. 8 and 33,) which operates a tripping device 194 for the connected pawls 195, that normally hold the two take-up rolls 30 (at the front and rear of the machine) in their lowest position. Immediately after the clutch 187 has been disengaged and the drawing-rolls stopped the pawls 195 are tripped and the take-up rolls 30 are lifted by the counterweights 39, connected with the arms 34. The take-up rolls are thus raised with a quick movement and in rising are rotated by the pinions 38 and racks 37 to take up the yarn from inside of the spinning-chamber sufficiently to provide for the downward movement of the filled bobbins from within the spinning-chambers, as has been previously explained.

By the mechanism thus far described the drawing-rolls are stopped and the take-up device is actuated just before the bobbins reach their highest position and pass the guide-eyes or approach them sufficiently to have the upper ends of the bobbins engage with the revolving material 40, as before explained, and the parts remain in this position for a short period of time, during which the yarn is wound upon the bobbins from the interior of the spinning-chambers by the continued rotation of the latter. This will commonly occupy from about one-half of a minute to a minute, and the actuating mechanism of the automatic appliances above described is timed to give sufficient time for the winding of the yarn onto the bobbins during one rotation of the slow-moving cam-shaft 153, after which the cam 196 (see Fig. 8) on said slow-moving cam-shaft lifts a rod 197, which trips the holding device 198 for the shipper-lever or handle 18, which then drops to the position marked "Stop" in Fig. 1 and by suitable connections, part of which are shown at 199, Figs. 1 and 3, disconnects the power from the belt 23, which drives the spinning-chambers, thus stopping the machine.

During the time in which the yarn is being wound upon the bobbins the operator may move back the carrier 120 of the traverse mechanism (see Fig. 2) to the proper position for the beginning of the spinning operation by turning the worm 121 by a suitable handle provided for that purpose, and the machine is then ready to be restarted for the next spinning operation.

When the bobbin-rail is lifted by the cam 156, as has been explained, the handle 11 of the bobbin-rail-lifting mechanism is retained in its upper position by a latch engaging the catch 161, (see Fig. 1,) and thus holds up the bobbin-rail after the actuating projection of the cam 156 has passed the roller 157, and the parts remain in the position shown in Fig. 4 after the machine has been fully stopped with the power taken off from the drawing-rolls, from the driving-belt of the spinning-chambers, and finally from the actuating-shaft 132 of the winding mechanism, as has been explained.

In restarting the machine to resume the spinning operation it is necessary to lower the handle 11, so as to lower the filled bobbins out from the spinning-chambers. In this operation the take-up device 30 is operated automatically to give out the yarn taken up by it in proportion to the descent of the bobbin-rail, as follows:

*Connection between the bobbin-rail and take-up.*—The rock-shaft 35, (see Fig. 33,) which carries the take-up roll 30, is provided with an arm 41, connected by a rod 42 with an arm 43, loose on the shaft 160, forming a part of the bobbin-rail-lifting mechanism. The said shaft has fixed thereon a latch-carrier provided with a latch or hook 44, which when the bobbin-rail is lowered by the operator depressing the handle 11 engages the hub of the arm 43 and causes the take-up roll 30 to move down in proportion as the bobbin-rail is depressed by the handle 11. Said take-up roll is controlled by the pawl 195 at the end of its downward movement, which prevents any rise of the said take-up roll until again released by its tripping mechanism. About as the handle of the bobbin-rail mechanism reaches its limit of downward movement, as shown in Fig. 33, the hook 44 comes against a stop 46 and is disengaged from the hub of the take-up-depressing arm 43, leaving the said take-up free to rise under the action of its counterweights 39 when next released by the tripping mechanism before described. The operator, before or after lowering the bobbins, as just described, starts the spinning-chambers by properly manipulating the handle 18, which when moved to start the spinning-chambers is retained by the lock or holding device 198, (see Fig. 8,) before described.

The downward movement of the handle 11, actuated by the operator, brings the parts to the position shown in Fig. 1 and in full lines, Fig. 22, the handle 11 being near but not quite down to the lowermost limit of its movement. The operator then depresses the handle 11 a little farther, in which movement the bobbin-rail 12 engages with a fixed stop 10, as shown in Fig. 22, so that the further depression of the bobbin-rail brackets 14 causes the said rail to be turned on said brackets to tip the bobbins forward, as shown in dotted lines, Fig. 22. This brings the yarn extending from the notch 17 in the end of each bobbin up through the spinning-chamber and guide-eye to the drawing-rolls against the edge of the spinning-chamber, so that the yarn is engaged by the finger 51 and broken off above the bobbin, and the part of the yarn between the guide-eye and finger 51 is caused to revolve with the spinning-chamber. The operator at this time starts the drawing-rolls by manipulating the handle 19, and the spinning operation is thus resumed. Then while the spinning operation is going on the bobbins may be withdrawn from their supports on the bobbin-rail and replaced by empty bobbins, after which the bobbin-rail handle is lifted enough to tip back the bobbin-rail to normal position, when the parts of the winding mechanism are ready to be operated automatically as soon as the spinning-chambers are filled. A guide-arm 27, connected with the bobbin-rail, is provided with a projection which enters a guide 28, (see Figs. 4 and 22,) which prevents the bobbin-rail from turning on its pivot on the bracket 14 during the upward and downward movement of the said bobbin-rail, the projection on the guide-arm 27 passing out from the guide 28 when the bobbin-rail arrives at the stop 10, so as to permit the rocking movement of the bobbin-rail to take place.

The spring 29, (see Fig. 23,) surrounding the pintle of the bobbin-rail, turns the said rail back to its normal position, when the handle 11 is released by the operator or raised slightly, so that the bobbin-rail is permitted to rise and turn around its pintle while engaging with the stop projection 10.

A small piece of yarn may be left engaged by the finger 51 of the spinning-chamber at the end of the winding operation when the end of the yarn first engaged by the spinning-chamber at the beginning of the spinning operation is reached at the end of the operation of winding the yarn onto the bobbin from the interior of the spinning-chamber. When the spinning-chambers are stopped, however, the finger 51 is moved by its spring from the interior surface of the spinning-chamber, and thus permits any yarn which may be left on said finger to fall out of the spinning-chamber.

It may be desirable to prevent the guide-eye rail from descending when the bobbin-rail is lowered to withdraw the filled bobbins from the spinning-chambers. Means are provided for retaining the guide-eye rail in its upper position, if desired, until lowered by the operator into control of the traverse mechanism. As shown in Fig. 1, the arm 171, that lifts the guide-eye rail from the bobbin-rail-lifting mechanism, is connected with a treadle 47, connected with a rod extending up at the rear of the spinning-chambers and provided near its upper end with a ratchet controlled by a pawl or locking device 48, connected with a handle 49, which may be placed in position to cause the locking-pawl 48 to cooperate with the treadle-rod or in position to disengage the said rod, if desired. When it is desired to prevent the guide-eye rail from descending into control of the traverse mechanism when the bobbin-rail is lowered, the handle 49 may be placed in the position marked "In," and the locking device 48 will then engage the guide-eye-rail-lifting mechanism. When it is desired again to place the guide-eye rail in control of the traverse mechanism, the operator places his foot on the treadle 47 and moves the handle 49 to the position marked "Out," thus releasing the treadle-rod, when the operator will gently lower the bobbin-rail into control of the traverse mechanism.

The bobbin and guide-eye rails have lifting-arms near each end of the machine connected by longitudinal links, as shown, so that when the arm near one end of the machine is operated by the mechanism hereinbefore described the corresponding arm at the other end has a like movement.

While the apparatus has been described as adapted for spinning yarn from roving, as is commonly practiced where the yarn is to be used for weaving cloth, it is obvious that the invention is not limited to this specific use, but may be employed for various spinning or twisting operations and is capable of wide variations in construction, the nature of which will depend upon the specific use to which the apparatus is to be put.

Various novel features have been described in connection with the hereinbefore apparatus for the purpose of disclosing a complete practical embodiment of the invention, which features are not claimed in this application, as in accordance with the classification adopted in the Patent Office they must form the subject of separate applications.

I claim—

1. In a spinning or twisting machine, the combination of means for spinning the material and collecting it in a hollow coil, means for driving said spinning means at high speed, and means for uncoiling said spun material and in the same operation winding it into a definitely-wound mass, substantially as described.

2. The combination of the spinning-chamber with a guide for the material to be spun or twisted contained within said chamber; and means for rotating said chamber at high speed, whereby the material delivered through said guide to the interior of the chamber is twisted and coiled upon the inner surface of said chamber, and means for uncoiling the spun yarn from the coiled mass while the chamber is rotating and winding it upon a bobbin or support, substantially as described.

3. The combination of the spinning-chamber, with a guide for the material to be spun or twisted contained in said chamber, and means for feeding the material to said guide and for rapidly rotating said chamber, means for stopping the feed of the material and means for winding the spun yarn onto a bobbin or support while the rotation of the chamber is maintained.

4. The combination of a rotatable chamber having an opening around the axis of rotation thereof, with a guide for the material to be spun or twisted supported within said chamber and capable of movement in the direction of the axis of rotation thereof, and a support adapted to be introduced into said chamber having provision for engaging the material between the guide and the wall of the chamber, whereby the spun material contained in the chamber will be caused by the rotation thereof to be wound upon said support, substantially as described.

5. The combination of the rotatable chamber having openings at both ends around its axis of rotation, with a guide for the material to be spun or twisted and a support for said guide extending through the opening at one end of the chamber, and a support for receiving the spun material adapted to be introduced into and withdrawn from the said chamber through the opening at the other end thereof, and having provision for engaging the material being spun, whereby the spun material is wound off from the interior of the chamber onto the support introduced therein, by the rotation of the chamber, substantially as described.

6. The combination of the rotatable chamber having openings at both ends around its axis of rotation, with a guide for the material to be spun or twisted and a support for said guide extending through the opening at one end of the chamber, and a support for receiving the spun material adapted to be introduced into and withdrawn from the said chamber through the opening at the other end thereof by a movement in the direction of the axis of rotation of the chamber, said support having provision for engaging the material being spun whereby the spun material is wound onto said support from the interior of the chamber by the rotation of the latter, and said support being mounted for lateral movement relative to the axis of rotation of the spinning-chamber after withdrawal therefrom whereby the end of the spun material extending through the guide to the support is drawn against the wall of the chamber, substantially as and for the purpose described.

7. The combination of the rotatable chamber having openings at both ends around its axis of rotation, with a guide for the material to be spun or twisted, and a support for said guide extending through the opening at one end of the chamber; and means for supplying the material through said opening and guide, and a support for receiving the spun material adapted to be introduced into and withdrawn from the said chamber through the opening at the other end thereof, and a rail or carrier for said support having a longitudinal and pivotal movement relative to the rotatable chamber, said chamber being provided with means for parting the material when brought into engagement therewith, substantially as described.

8. The combination with the rotatable spinning-chamber; of a surrounding shell serving as an outer bearing member therefor; and means for maintaining a film or body of air between said chamber and shell whereby the former may be rotated without frictional contact with the metallic bearing member, substantially as described.

9. The combination with the rotatable spinning-chamber having a lateral projection or flange; of a shell surrounding said chamber provided with a corresponding lateral projection or flange; and means for supplying compressed air in the space between said flanges, substantially as described.

10. The combination with the rotatable spinning-chamber and a surrounding shell serving as an outer bearing member therefor, the said chamber having a neck outside said shell constituting a driving-pulley for the chamber; of a rail upon which said surrounding shell is pivotally supported; a driving-belt; and means for yieldingly impelling said outer bearing member or shell about its pivotal connection with the rail, whereby the neck of the chamber is yieldingly pressed against the driving-belt, substantially as described.

11. A spinning-chamber open at both ends, feeding instrumentalities to feed the material into one end, and means for removing the spun material from the other end, substantially as described.

12. A rotatable spinning-chamber having a tubular neck through which the material to be spun enters the chamber, combined with a driving-belt, and means for yieldingly pressing the tubular neck of the spinning-chamber against said driving-belt, substantially as and for the purpose described.

13. A spinning-chamber adapted to receive the spun material and collect it in a coiled mass, feed-rolls, a support movable into and out of said chamber, whereby the spun material is wound upon said support and removed therewith from inside of the spinning-chamber, means for providing a length of spun material between the feed-rolls and the removed wound material, and means for parting the said length, and for engaging the end of the material with the rotating chamber for resuming the spinning operation, substantially as described.

14. A spinning-chamber adapted to receive the spun material and collect it in a coiled mass, a take-up, and means for operating it to withdraw a length of spun material from said coiled mass, and thereafter to give out said length of spun material, whereby a length of spun material is obtained for again starting the spinning operation.

15. A spinning-machine having in combination, a spinning-chamber arranged vertically, means to support the same axially, a driving mechanism, means operable at will to engage said chamber and driving mechanism whereby the chamber is rotated, and a lateral support surrounding said chamber and of slightly-greater diameter than said chamber.

16. A spinning-machine having, in combination, a driving-band, a plurality of spinning-chambers, each having a tubular neck through which the material to be spun enters the chamber, and means operable at will, in connection with each spinning-chamber, for causing the tubular neck thereof to be pressed yieldingly against the driving-belt, or to be disengaged therefrom, substantially as and for the purpose described.

17. A cylindrical spinning-chamber, means to support the same axially, and a cylindrical lateral support surrounding said chamber of slightly-larger diameter than said chamber, whereby a film of air is maintained between said chamber and said support.

18. A spinning-chamber adapted to receive the spun material and collect it in a coiled mass, means for rotating said chamber, drawing-rolls, means for automatically stopping the drawing-rolls when sufficient spun material has been collected, a device for engaging the material between the drawing-rolls and the coiled mass and drawing a portion of the spun material from the inside of the coiled mass and winding it on a support.

19. A spinning-chamber adapted to receive the spun material and collect it in a coiled mass, a take-up, and means for operating it to withdraw a length of spun material from said coiled mass, a support movable into and out of said chamber, and means for operating the take-up to give out said length of spun material as the said support is withdrawn from the chamber.

20. A spinning-chamber, a guide-eye, traversing mechanism for traversing said guide-eye within said chamber, a support and means for moving it into and out of said chamber, and connecting mechanism between said means and said guide-eye whereby near the end of the movement of the support into said chamber it lifts said guide-eye and then releases it.

21. A spinning-frame having in combination a spinning-chamber, a guide-eye, traversing mechanism for traversing said guide-eye within said chamber, a support, and mechanism for moving said support into said chamber automatically set in operation by said traversing mechanism.

22. A spinning-chamber adapted to receive the spun material and collect it in a hollow coiled mass, a support for receiving the spun material movable into and out of said chamber, means for tilting said support with the spun material thereon after its withdrawal from said chamber and an engaging device on said chamber for engaging the spun material and parting it between the chamber and the support.

23. A spinning-chamber, means for rotating it, and a spring thread-catch on the inside of said chamber held in operative position against the side of said chamber when said chamber is rotated.

24. In a spinning-frame, the combination with the drawing-rolls for delivering the material to be spun, with the hollow spinning-chamber and guide-eye movable in said chamber; and means controlled by the material between the drawing-rolls and guide-eye for stopping the material passing to the drawing-rolls upon breakage of the material between the drawing-rolls and guide-eye.

25. A spinning-frame having in combination, spinning-chambers, supports movable into and out of said chambers, a take-up, take-up-operating mechanism, manually-operated devices for withdrawing said supports from within the chamber, and connecting mechanism with said take-up-operating mechanism whereby when said supports are withdrawn, the take-up is operated to give up material.

26. A spinning-frame having in combination a spinning-chamber, means for rotating said chamber at high speed, feeding instrumentalities for feeding the material to be spun into said chamber, said chamber having an opening at one end to receive said material, and a lateral bearing for said chamber surrounding said chamber and of slightly larger diameter than said chamber.

27. A spinning-frame having in combination spinning devices, including spinning-chambers of the character specified, a support-carrying rail, means for moving one of said elements relatively to the other, and means for tilting said rail, substantially as described.

28. In a spinning-frame, the combination of the following instrumentalities; spinning appliances each comprising a spinning-chamber and means for rotating the same at high speed, and a guide-eye, and traverse mechanism for moving the guide-eyes in the spinning-chambers; and winding mechanism; and connecting mechanism between the traverse mechanism and the winding mechanism whereby the latter is called into operation by the traverse mechanism, substantially as and for the purpose described.

29. In a spinning-frame, the combination of the following instrumentalities; spinning appliances each comprising a spinning-chamber and means for rotating the same at high speed; and a guide-eye, and traverse mechanism for moving the guide-eyes in the spinning-chambers; and winding mechanism comprising a series of supports and mechanism for actuating the same to carry the said supports into the spinning-chambers; and connecting mechanism between the traverse mechanism and the winding mechanism whereby the latter is called into operation by the traverse mechanism, substantially as and for the purpose described.

30. In a spinning-frame the combination of the spinning-chambers with the guide-eyes and guide-eye rail, and traverse mechanism for operating the guide-eye rail to traverse the guide-eyes in the spinning-chambers; a bobbin-rail and means to actuate the same to introduce the bobbins thereon into the spinning-chambers; and connecting mechanism between the guide-eye rail and the bobbin-rail whereby the latter controls the position of the former and causes a movement of the guide-eyes relative to the bobbins when the latter are introduced in the spinning-chambers, substantially as and for the purpose described.

31. The combination of the spinning appliances, including the drawing-rolls, guide-eyes, and spinning-chambers open at both ends, with the bobbin-rail and actuating mechanism for moving it relative to the spinning-chambers to introduce the bobbins carried thereby into the spinning-chambers; means controlled by said mechanism to stop the drawing-rolls; and a take-up operating upon the material between the drawing-rolls and the spinning-chambers also called into operation by said bobbin-rail-lifting mechanism, substantially as described.

32. The combination of the spinning appliances, each comprising a spinning-chamber and means for rotating the same at high speed, and a guide-eye, with traverse mechanism for moving the guide-eyes in the spinning-chambers; and winding mechanism for receiving and removing the spun material from the spinning-chambers, and connecting mechanism between the traverse mechanism and winding mechanism for calling the winding mechanism into operation, and means controlled by the winding mechanism for stopping the same when the winding operation is completed, substantially as described.

33. The combination with the spinning-chambers and means for supplying the material to be spun thereto, and supports adapted to be introduced into the spinning-chambers to have the spun material wound thereon, with a take-up device operating upon the material between the point of supply and its entrance to the spinning-chamber, comprising a roll having on its periphery a guide for said material and mechanism for moving the said roll from the spinning-chamber and rotating the roll in its movement whereby a portion of the material is drawn back from the spinning-chamber and taken up by the roll, substantially as and for the purpose described.

34. The combination with the spinning-chambers and means for supplying the material to be spun thereto, and supports adapted to be introduced into the spinning-chambers to have the spun material wound thereon, and to be thereafter withdrawn from the spinning-chambers, with a take-up device operating upon the material between the point of supply and its entrance to the spinning-chamber, comprising a roll having on its periphery a guide for said material and mechanism for moving the said roll from the spinning-chamber and rotating the roll in its movement whereby a portion of the material is drawn back from the spinning-chamber and taken up by the roll, and connecting mechanism between said supports and take-up roll whereby the latter is operated to give back the material taken up by it while the supports are being moved out from the spinning-chambers.

35. In a spinning-frame the combination with the drawing-rolls, of spinning-chambers, and guide-eyes and a guide-eye rail and traverse mechanism for traversing said guide-eye rail; and winding mechanism comprising a bobbin-rail and mechanism for actuating the same to introduce the bobbins thereon to the spinning-chambers; and connecting mechanism between the traverse mechanism and winding mechanism for calling the latter into operation, and connecting mechanism between the guide-eye rail and bobbin-rail whereby the latter when moved to introduce the bobbins into the spinning-chamber engage the guide-eye rail and prevents the bobbins from passing the guide-eyes until near the end of the movement of the bobbins the spinning-chambers, and causes the ends of the bobbins to pass the guide-eyes just as said movement is completed, substantially as and for the purpose described.

36. In a spinning-frame spinning appliances comprising drawing-rolls, spinning-chambers, guide-eyes, a guide-eye rail and traverse mechanism for traversing said guide-eye rail; and mechanism for winding and removing the spun material from the chambers, comprising bobbins or supports and a bobbin-rail for carrying said supports into and out from the spinning-chambers, a take-up acting upon the material between the drawing-rolls and the spinning-chambers, and means for stopping the drawing-rolls, and actuating mechanism for said winding mechanism normally at rest; and connecting mechanism between the traverse mechanism and the winding mechanism for starting the latter into operation; and connecting mechanism between the bobbin-rail of the winding mechanism and the guide-eye rail of the spinning mechanism for controlling the position of the guide-eyes relative to the bobbins when the latter are introduced into the spinning-chambers to have the spun material wound thereon, substantially as described.

In testimony whereof I have signed my name to this specification in the presence of two subscribing witnesses.

FREDERICK WENTWORTH SAWYER.

Witnesses:
HENRY J. LIVERMORE,
JAS. J. MALONEY.